US012541842B2

(12) United States Patent
Gandman

(10) Patent No.: US 12,541,842 B2
(45) Date of Patent: Feb. 3, 2026

(54) APPARATUS AND METHOD FOR SENSING AND ANALYZING SKIN CONDITION

(71) Applicant: LUMENIS BE LTD., Yokneam (IL)

(72) Inventor: Andrey Gandman, Haifa (IL)

(73) Assignee: LUMENIS BE LTD., Yokneam (IL)

( * ) Notice: Subject to any disclaimer, the term of this patent is extended or adjusted under 35 U.S.C. 154(b) by 605 days.

(21) Appl. No.: 17/892,375

(22) Filed: Aug. 22, 2022

(65) Prior Publication Data

US 2022/0405930 A1 Dec. 22, 2022

Related U.S. Application Data

(63) Continuation-in-part of application No. 17/565,709, filed on Dec. 30, 2021, which is a (Continued)

(51) Int. Cl.
*G06T 7/00* (2017.01)
*G01N 23/203* (2006.01)
(Continued)

(52) U.S. Cl.
CPC ......... *G06T 7/0012* (2013.01); *G01N 23/203* (2013.01); *G06V 10/141* (2022.01);
(Continued)

(58) Field of Classification Search
CPC ......... G06T 7/0012; G06T 2207/30088; G06T 2207/30204; G01N 23/203; G06V 10/141;
(Continued)

(56) References Cited

U.S. PATENT DOCUMENTS

2006/0253176 A1  11/2006  Caruso et al.
2007/0198004 A1   8/2007  Altshuler et al.
(Continued)

FOREIGN PATENT DOCUMENTS

WO         2013144184        10/2013
WO     WO 2014/073645    *   5/2014
(Continued)

OTHER PUBLICATIONS

Machine translation for WO 2014/073645 (Year: 2014).*
(Continued)

*Primary Examiner* — Qian Yang
(74) *Attorney, Agent, or Firm* — ISUS INTELLECTUAL PROPERTY PLLC; Anthony Jason Mirabito

(57) ABSTRACT

A skin imaging and diagnostic method and apparatus comprising, a frame, configured to circumscribe a target tissue on the skin of a patient. An electro-optics unit of the apparatus comprising: an illuminator assembly comprising illuminating elements, configured to provide illumination light on the target tissue; an imaging optics assembly; and an image sensor assembly, comprising an image sensor, wherein the imaging optics assembly is configured to collect backscattered said illumination light from the target tissue and focus the collected backscattered illumination light on the image sensor; and the image sensor is disposed to consequently sense an image of the target tissue. A controller configured to activate illuminating elements and to capture each image from the image sensor.

17 Claims, 27 Drawing Sheets

Related U.S. Application Data continuation-in-part of application No. 17/226,235, filed on Apr. 9, 2021.

(60) Provisional application No. 63/132,554, filed on Dec. 31, 2020.

(51) Int. Cl.
  *G06V 10/141* (2022.01)
  *G06V 10/143* (2022.01)

(52) U.S. Cl.
  CPC .. *G06V 10/143* (2022.01); *G06T 2207/30088* (2013.01); *G06T 2207/30204* (2013.01)

(58) Field of Classification Search
  CPC ............... G06V 10/143; G06V 40/10; A61B 2017/00747; A61B 90/361; A61B 2018/00916; A61B 2018/1807; A61B 2090/309; A61B 2090/363; A61B 2017/00057; A61B 2017/00752; A61B 2017/00769; G16H 40/67; G16H 20/40; G16H 40/63; G16H 50/20; A61N 2005/0644; A61N 5/0616; A61N 5/067; A61N 2005/0626
  See application file for complete search history.

(56) References Cited

U.S. PATENT DOCUMENTS

| | | |
|---|---|---|
| 2013/0345685 A1 | 12/2013 | Poran et al. |
| 2015/0230863 A1 | 8/2015 | Youngquist et al. |
| 2019/0125197 A1* | 5/2019 | Fukuda ............... A61B 5/0077 |
| 2019/0240502 A1* | 8/2019 | Anderson ............. A61K 35/04 |
| 2020/0390362 A1* | 12/2020 | Westerhof ............ A61B 5/442 |
| 2021/0265060 A1* | 8/2021 | Aoki ..................... G16H 30/20 |
| 2022/0203115 A1 | 6/2022 | Gandman et al. |
| 2022/0214218 A1 | 7/2022 | Jang et al. |

FOREIGN PATENT DOCUMENTS

| | | |
|---|---|---|
| WO | 2016134093 | 8/2016 |
| WO | WO 2017/074378 * | 5/2017 |
| WO | 2022144831 | 7/2022 |

OTHER PUBLICATIONS

Search Report and Written Opinion—Corresponding PCT Application No. PCTIB2021062481, dated Apr. 4, 2022, 14 pages.

Search Report and Written Opinion—Corresponding PCT Application No. PCTIB2023058328, dated Feb. 14, 2024, 23 pages.

* cited by examiner

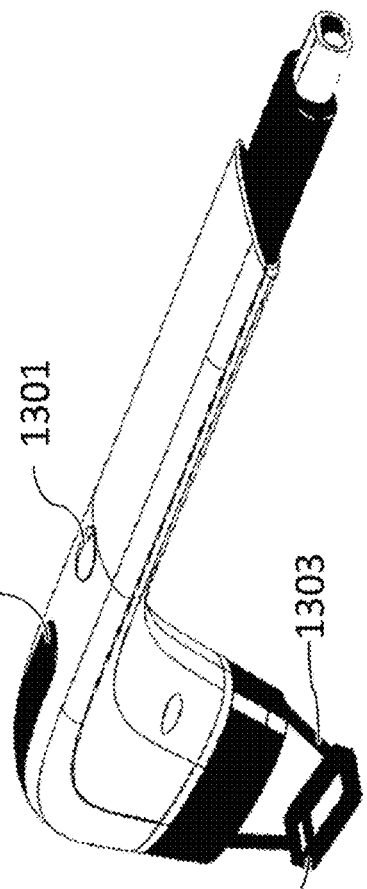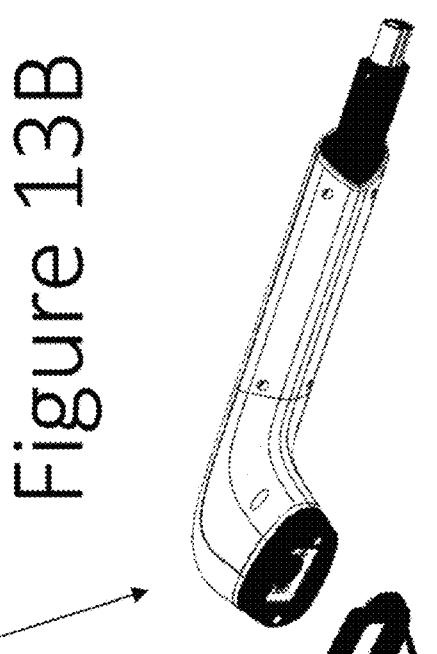

APPARATUS AND METHOD FOR SENSING AND ANALYZING SKIN CONDITION

RELATED APPLICATIONS

This application is a continuation-in-part to Ser. No. 17/565,709, filed 30 Dec. 2021; which is a continuation to U.S. Provisional Application No. 63/132,554, filed Dec. 31, 2020, entitled "Method and System for Real Time Monitoring of Cosmetic Laser Aesthetic Skin Treatment Procedures," and is a Continuation-In-Part to U.S. patent application Ser. No. 17/226,235, filed Sep. 4, 2021, entitled "Real Time Monitoring of Cosmetic Laser Aesthetic Skin Treatment Procedures". The entire contents of the above three related applications, from which priority is claimed, as well as Ser. No. 17/834,059 filed 7 Jun. 2022 and 63/393,93 filed 31 Jul. 2022 are incorporated herein by reference.

FIELD OF THE INVENTION

The invention is in the field of diagnostic imaging, and in particular relates to sensing and analysis of skin condition.

BACKGROUND TO THE INVENTION

Therapeutic and aesthetic energy-based treatments, such as lasers are utilized for procedures on skin, such as hair removal, tattoo removal, vascular removal, pigmented lesions, skin tightening, and/or skin rejuvenation.

Typically, medical personnel manually use a handpiece to deliver such treatments, and the medical personnel will note skin attributes to determine the laser parameters for treatment. The skin attributes may be skin type, presence of tanning, hair color, hair density, hair thickness, blood vessel diameter, blood vessel depth, lesion type, pigment depth, pigment intensity, tattoo color, tattoo type. PCT application number PCT/IL2019/051091, assigned to the assignee of the present disclosure, is directed to some features of the therapeutic and aesthetic energy-based treatment and is herein incorporated by reference in its entirety.

U.S. patent application Ser. No. 17/565,709 discloses an apparatus for treating skin tissue with a source of treatment light comprising a display and a source of treatment light along an optical axis. The apparatus further comprising a handpiece which comprises; a hand help pathway for the source of treatment light, one or more sources of illumination light symmetrically surrounding the optical axis, and one or more sensors that may be image sensors configured to obtain measured light along the optical axis. The apparatus further comprising a controller (also known as a "programmable controller" and a "control unit") is configured to; activate the illumination light, receive an output of the information sensed of measured light by the image sensors, analyze the measured light received from the image sensors, provide a list of skin attributes to the display based on analysis of the information sensed of measured light received, and provide a suggested treatment light regimen to the display. In some embodiments, the controller is a processor and in some embodiments the controller is a processor, memory and input/output (I/O) combined.

The present disclosure advances the state-of-the-art in technology for sensing and analyzing skin condition, which can be especially advantageous for formulating a skin treatment regimen.

SUMMARY

In an aspect, an apparatus for skin imaging apparatus comprising, a frame, configured to circumscribe a target tissue on the skin of a patient; an electro-optics unit, comprising an illuminator assembly, comprising illuminating elements, configured to provide illumination light on the target tissue; an imaging optics assembly; and an image sensor assembly, comprising an image sensor, wherein the imaging optics assembly is configured to collect backscattered said illumination light from the target tissue and focus the collected backscattered illumination light on the image sensor; and the image sensor is disposed to consequently sense an image of the target tissue. In addition, a controller, configured to turn the illuminating elements on and off and to capture each said image from the image sensor.

In another aspect the apparatus comprises fiducial markers on the frame, wherein the fiducial markers are included in each image, the controller configured to employ the fiducial markers for registration of multiple images, the illumination elements are in sets, each set of illumination elements having a different optical spectrum. The skin imaging apparatus, wherein the sets of illumination elements are LEDs with different peak wavelengths, and one or more of the illumination elements are configured to illuminate the target tissue in sequence for capturing a plurality of images, and the images therefrom are subsequently combined.

In yet another aspect, the skin imaging apparatus, wherein one or more of the illumination elements are configured simultaneously to illuminate the target tissue for capturing an image, and the image compositor is configured to produce one or more of the following types of composite images: an RGB image, a skin melanin map, a skin erythema map, a blood vessel map, a photon scattering map, an intermediate melanin map; a deep melanin map, a blood vessel depth map; tattoo ink analysis map; wrinkles map; lesion map; acne map; cellulite map, a pigment depth map; a vascular map; a vascular depth map; or any combination thereof.

In an aspect, the skin imaging apparatus further comprising; an image compositor, communicatively connectible to the controller, configured to receive the captured images, captured under different spectral illumination, from the controller and to mix combinations of the received spectral images to produce a composite image; a display communicatively connectable to the image compositor, configured to display any combination of captured images, composite images, and numerical parameters and an analyzer communicatively connectible to the image compositor, the analyzer configured to, receive any combination of captured images and composite images; and compute, based on the received images, a skin condition parameters, diagnosis of a skin condition, parameters of a suggested treatment course, or any combination thereof; send the diagnosis or parameters to the display.

In an aspect, the skin imaging apparatus, wherein the image compositor and/or analyzer are further configured to compute numerical parameters of the target tissue, on the basis of any combination of the captured images, composite images, or analysis thereof, and the skin condition parameters comprise any combination of, skin type; a pigment density value; a vascular density value; a vascular depth value; a pigment intensity value; VL/PL ratio; a hair mask; a hair mask file; a skin melanin level; a skin erythema level; a hair melanin level; a hair diameter; a hair density; a hair width; a hair count; a blood vessel depth; a blood vessel diameter; a melanin contrast; a melanin depth; and a pigment depth.

In another aspect, there is a skin imaging and diagnostic method comprising, providing, a frame for applying to a target tissue on the skin of a patient, an illuminator assembly configured to provide illumination light on the target tissue, one or more image sensors, a display, an image compositor, an image analyzer and a controller; circumscribing the target tissue on the skin of a patient with the frame; activating, by the controller, the illumination light; collecting, by an image optic assembly, backscattered said illumination light from the target tissue; focusing, by the imaging optics assembly, the collected backscattered illumination light, onto the one or more image sensors; processing, by the controller, the illumination light received by the one or more sensors to produce one or more images captured under different illumination spectra; compositing, by the image compositor, the one or more images captured to produce a plurality of composited images representing a plurality of skin attributes of the target skin; and displaying, by the controller and based on the image compositor, on the display, the plurality of composited images representing a plurality of skin attributes of the target skin.

In yet another aspect, there is a skin imaging and diagnostic method further comprising an analyzer configured to analyze received images and composite images, from a memory associated with the controller; computing, by the analyzer, at least one of, a skin condition parameter, a diagnosis of a skin condition, and parameters of a suggested treatment course; and displaying, on the display, at least one of, the diagnosis of a skin condition, and the parameters of a suggested treatment course. Also, further comprising fiducial markers on the frame, wherein the fiducial markers are included in each image and the controller is further configured to employ the fiducial markers for registration of multiple images.

The method of claim 14, wherein the illumination lights are LEDs with different peak wavelengths.

In another aspect, there is a skin imaging and diagnostic method, wherein the illumination lights are configured to illuminate in sequence for capturing multiple images, and the images therefrom are subsequently combined, the image compositor is configured to produce one or more of the following types of composite images: an RGB image, a skin melanin map, a skin erythema map, a blood vessel map, a photon scattering map, an intermediate melanin map; a deep melanin map, a blood vessel depth map; tattoo ink analysis map; wrinkles map; lesion map; acne map; cellulite map, a pigment depth map; a vascular map; a vascular depth map; or any combination thereof, and the skin condition parameter may comprise any combination of, skin type; a skin melanin or pigment map; a pigment density value; a vascular density value; a pigment depth map; a vascular depth value; a vascular map; an erythema map; a vascular depth map; a scattering map; a pigment intensity value; VL/PL ratio; a hair mask; a hair mask file; a skin melanin level; a skin erythema level; a hair melanin level; a hair diameter; a hair density; a hair width; a hair count; a blood vessel depth; a blood vessel diameter; a melanin contrast; a melanin depth; and a pigment depth.

BRIEF DESCRIPTION OF THE DRAWINGS

Some embodiments of apparatuses and/or methods will be described in the following drawings, by way of example only.

FIG. 6A-I illustrate a smart tip according to some embodiments of the present disclosure.

FIGS. 13A and 13B are external views of the handpiece according to some embodiments of the invention.

DETAILED DESCRIPTION

The present invention is directed to provide a system and method to provide dynamic imaging and real time monitoring of laser treatments in a laser treatment system. A treatment laser may be one that targets the skin tissue, gets absorbed by one or more chromophores and causes a cascade of reactions, including photochemical, photothermal, thermal, photoacoustic, acoustic, healing, ablation, coagulation, biological, tightening or other any other physiological effect. Those reactions create the desired treatment outcomes such as permanent hair removal, hair growth, pigmented or vascular lesion treatment of soft tissue, rejuvenation or tightening, acne treatment, cellulite treatment, vein collapse, or tattoo removal which may include mechanical breakdown of tattoo pigments and crusting.

Figures 10A, 10B:
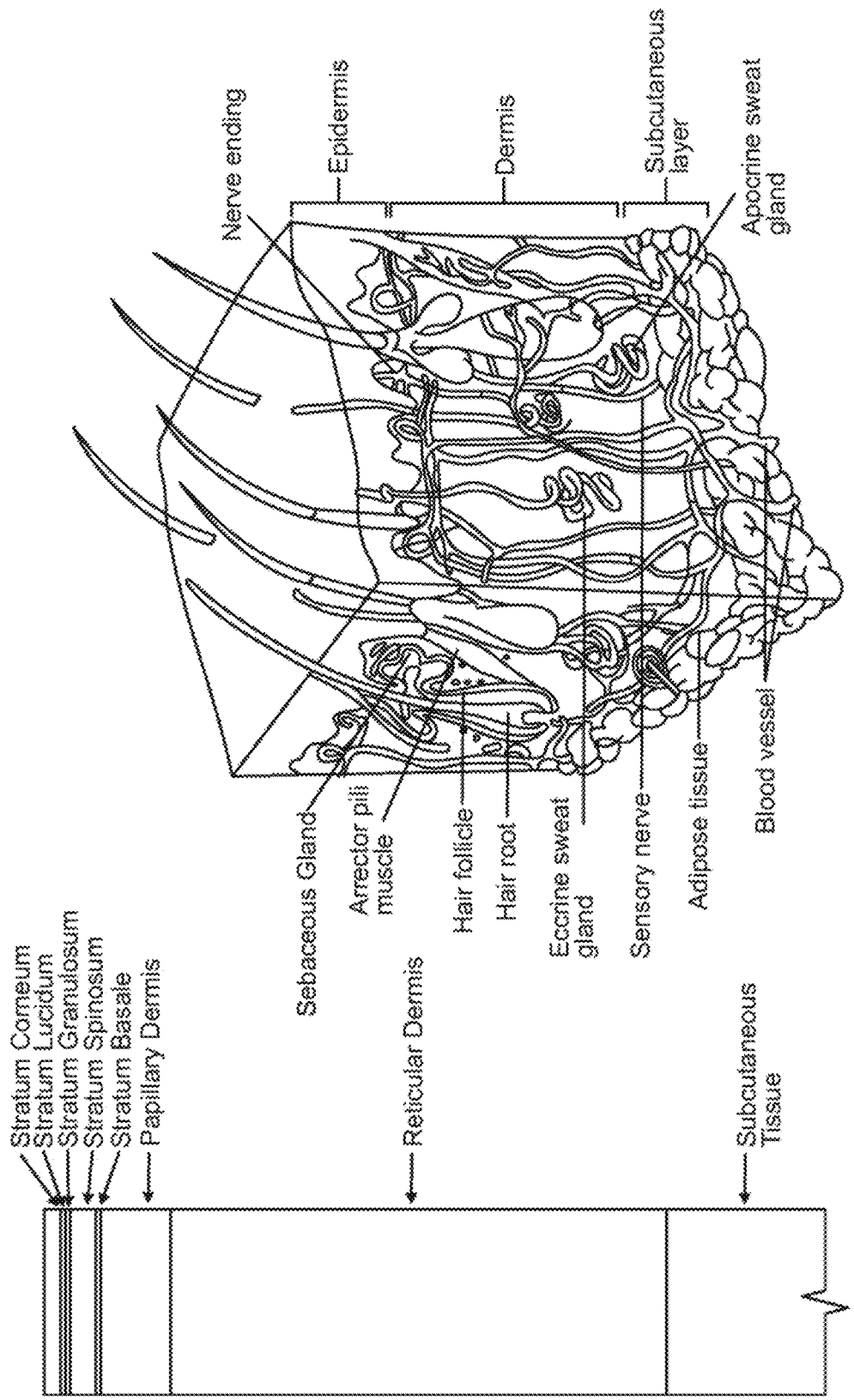
FIG. 10A illustrates the histological layers of typical human skin tissue.
FIG. 10B illustrates a schematic representation of various layers of human skin tissue.

Skin tissue is a very complex biological organ. Although the basic structure is common to all humans (see FIGS. 10A and 10B), there are many variations within the different areas in a specific individual and among individuals. Variations include skin color (melanin content in Basal layer), hair color and thickness, collagen integrity, blood vessel structure, vascular and pigmented lesions of various types, foreign objects like tattoos, etc.

Figure 1:
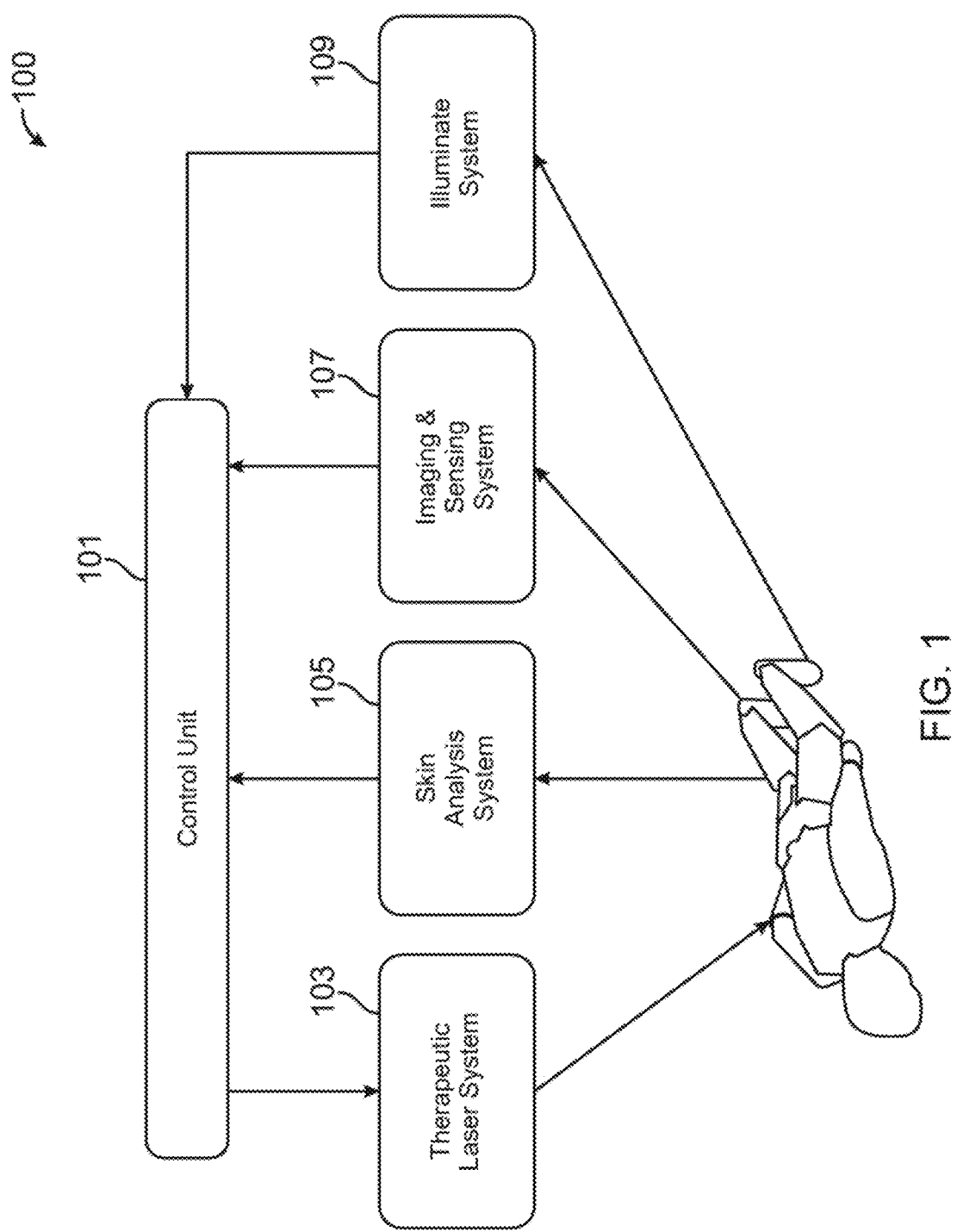
FIG. 1 illustrates a high-level functional architecture scheme of the present disclosure.

FIG. 1 is a conceptual illustration of a high-level system functional architecture of a diagnostic and treatment system 100 for skin. A controller or control unit 101 manages a therapeutic laser system 103, skin analysis and diagnostic system 105, a sensing system 107 (e.g., an imaging optics assembly and an image sensor assembly) and an illumination system 109. In some embodiments, the therapeutic laser system 103, is a therapeutic energy-based system and that energy-based system may be Intense Pulsed Light (IPL) or Radio Frequency (RF) or a combination of both IPL and RF.

In some embodiments, diagnostic and treatment system 100 illuminates a target skin or tissue under various illumination spectra (e.g., peak wavelengths), and sensing system 107 captures the illumination light reflected or back scattered from skin tissue. The image sensors measure the light reflected or back scattered from the illuminated skin tissue (hereinafter images) thus obtaining information. These images (of different wavelengths, polarizations, and patterns) with their corresponding meta-data for each peak wavelength illuminated are thereby obtained. (As used herein, a "peak wavelength" is the wavelength where a radiometric emission spectrum of the light source reaches its maximum, because a light source may output additional wavelengths until reaching the peak wavelength.)

In some embodiments, images and corresponding meta-data (hereinafter diagnostic data) are parsed and analyzed for more information about the target tissue and/or its location. With this method, basic skin optical and physical properties up to about 5 millimeters deep may be obtained (see FIGS. 11A and 11B.) The diagnostic data may be analyzed by, and is not limited to, the following; Principal Component Analysis (hereinafter PCA), physical modelling, unique algorithm, neural network algorithms, or any combination thereof. In some embodiments, the diagnostic data is collected and stored into a database. In some embodiments, the parsed and analyzed diagnostic data are also collected and stored into the database.

In some embodiments, the PCA is the method of analysis and the PCA enables robust classification of valuable parameters while reducing overall dimensionality of the acquired data. The most relevant parameters may be employed for the development of a physical laser-tissue interaction model, including, for example, thermal relaxation and soft tissue coagulation. Moreover, large amounts of highly correlated data allow for construction of empirical equations which are based on quantitative immediate biological responses like erythema in hair removal and frosting formation in tattoo removal treatments.

In some embodiments, use of artificial intelligence technology e.g., deep learning (DP) may be used to analyze the diagnostic data. Deep learning involves the use of complex, multi-level "deep" neural networks to create systems that can perform feature detection from massive amounts of unlabeled training data.

Figure 2:
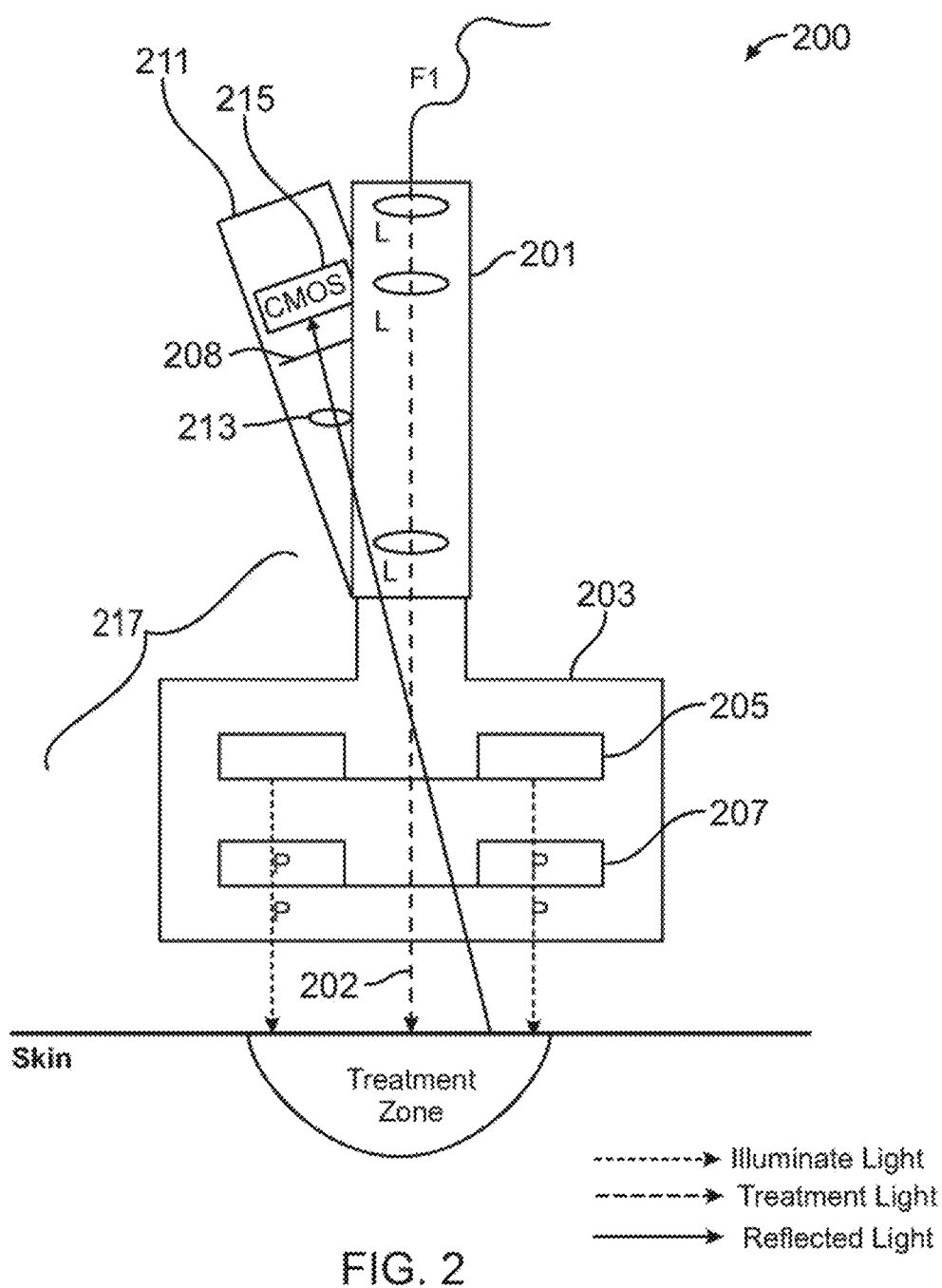
FIGS. 2 and 3 illustrate schematics of a handpiece which embody aspects of the present disclosure.

In some embodiments of the diagnostic and treatment system, an integrated treatment and imaging laser handheld handpiece is operable to collect data from a target tissue. In some embodiments, the handpiece does not directly contact the skin. In some embodiments, the handpiece directly contacts the skin. FIG. 2 is a functional diagram of an exemplary embodiment of a handpiece 200, and many other variations of a handpiece 200 may be implemented. A treatment laser unit 201 comprises lenses L and other optic features as may be required. These optic features will vary with clinical indications and the effect of coupling the handpiece's treatment laser unit 201 with the diagnostic and treatment laser system 103. The treatment laser unit 201 may further comprise a high-power laser fiber input source (F1), Treatment laser unit 201 may be a laser delivery unit. In some embodiments, the treatment laser unit is a handpiece which is connected to a laser console with a fiber and/or an articulated arm. In some embodiments, the treatment laser unit may have an integrated laser or light source housed within. In the current disclosure, the laser may be in the Splendor X system available from Luminism Ltd. of Israel, and the treatment laser unit may be part of the handpiece that delivers the laser to the target tissue. The treatment laser unit and the treatment laser system have different parameters of use that include wavelength, spot size, fluence, pulse duration, and pulse rate.

An illuminator assembly 203, in some embodiments, comprises illumination substrate 205 to support specific illumination elements, polarization illumination optics 207, and clear protection element (not shown). In some embodiments, this illuminator assembly 203 may have various optics and physical configurations. Optical axis 202 of laser system 201 is barrier free on the path to the skin, and the illuminator assembly optics may be configured such that there is no barrier to the optical axis. In some embodiments, the illumination elements are a configuration of intense light such as Light Emitting Diodes (hereinafter LED light source.) The illumination system may be housed in a tip component 217 (401 in FIG. 4B) further discussed below.

In some embodiments, handpiece 200, further comprises an image sensor assembly 211 for obtaining images, an imaging lens assembly 213, and polarization image optics 208. The image sensor assembly 211 may comprise a CMOS or other image sensor 215. In some embodiments, polarization image optics 208 have polarization orthogonal to the polarization illumination optics 207, such that skin surface layer back scattering of the same illumination polarization is avoided.

In some embodiments, handpiece 200 may have folding mirrors (FM) or other optic elements required to ensure accurate capture by image sensor 215 of images based on the position of the image unit on the handpiece 200. In some embodiments, the controller 101 prevents the image sensor 215 from capturing images during operation of the laser system. In some embodiments, the image sensor 215 is protected by a shutter.

In some embodiments of the current disclosure, the system may be a diagnostic system and not a treatment system. In such embodiments, a handpiece may have an illuminator assembly and an image sensor assembly (not shown) with connection to a skin analysis and diagnostic system 105.

Figure 3:
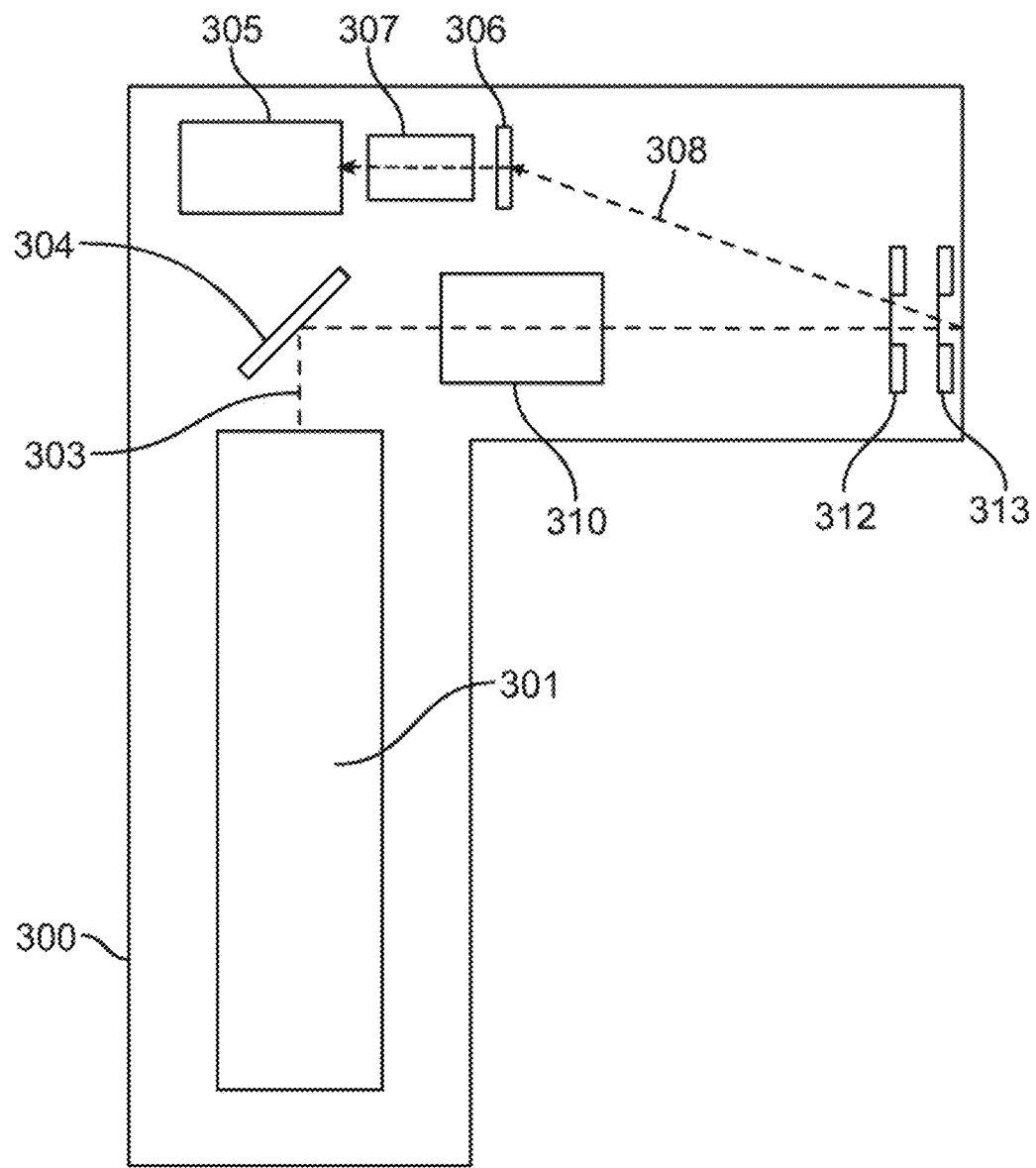

In some embodiments of a handpiece, the laser power source may be a laser module 301 included in the handpiece as illustrated FIG. 3. Here, instead of the laser input source (F1), there may be a laser module 301, which may be a solid-state laser source of a known type. Handpiece 300 may further comprise a folding mirror 304 to alter a laser axis path 303. Further down the laser optical path, in this example, are focus optics 310, an illumination substrate 312 and a polarization illumination film or optics 313. In some embodiments, the imaging unit of handpiece 300 comprises an image sensor assembly (comprising at least an image sensor) 305, polarization image optics 307, and an imaging optics assembly (also known as focus optics) 306. An imaging axis 308 is the path of the image to the image sensor assembly 305. In some embodiments, the angle of imaging optics assembly 306 and image sensor assembly 305 are optically arranged such that the image provided is a flat image or perpendicular to the laser axis 303 and not the imaging axis 308.

Figure 4A:
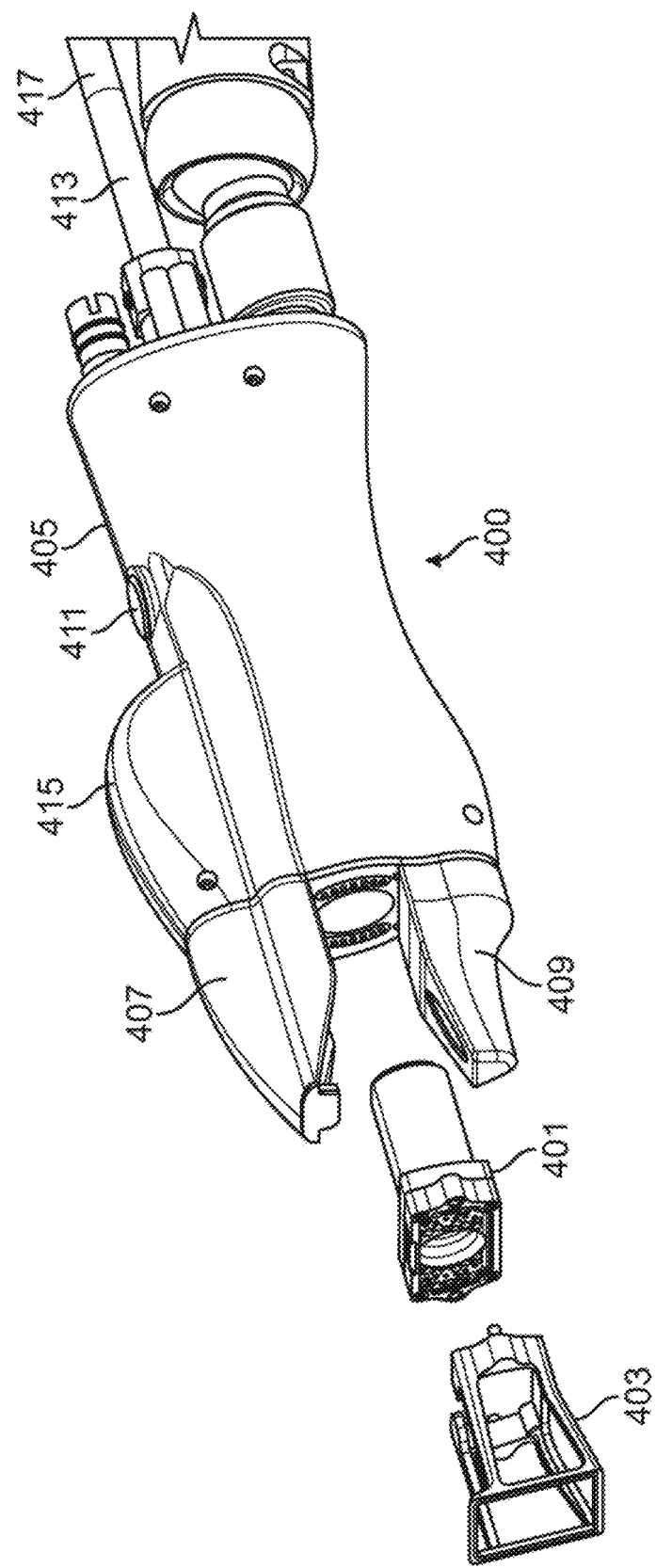
FIGS. 4A and 4B illustrate schematics of a handpiece, in some embodiments of the present disclosure.
Figure 4B:
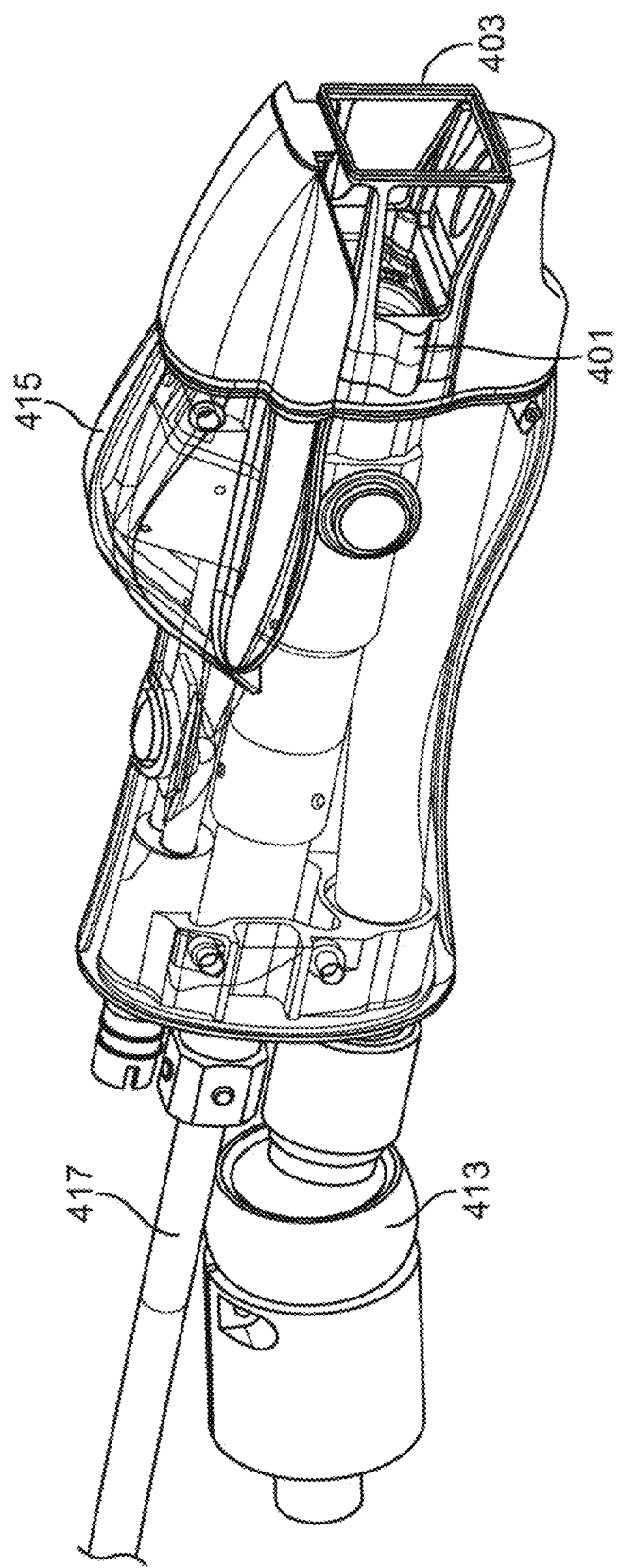

In some embodiments, a handpiece 400 has a handle 405, a tip 401 that houses an illuminator assembly that attaches to handle 405, as illustrated in FIGS. 4A-4B. In some embodiments, a frame 403 is configured to circumscribe a target tissue, in order to stretch or flatten the target tissue for obtaining images. In some embodiments, frame 403 connects to tip 401 with magnets or similar connections known in the art. In some embodiments, the frame 403 stretches or flattens a skin treatment area to 0-2 mm to allow using an imaging optics assembly with constant focus.

The handpiece 400 may have a suction channel 407 for receiving skin debris produced by a treatment laser, as well as a skin cooling unit 409. In some embodiments, a switch 411 is operable for a user to start the process of obtaining images from the target tissue. The handpiece 400 may have an imaging unit comprising the image sensor assembly, the polarization image optics, and the imaging optics assembly, housed in area 415 of the handpiece 400. Treatment laser umbilical 417 and coolant hose 413 are configured to connect handpiece 400 to a base diagnostic and treatment system or console.

Figure 5:
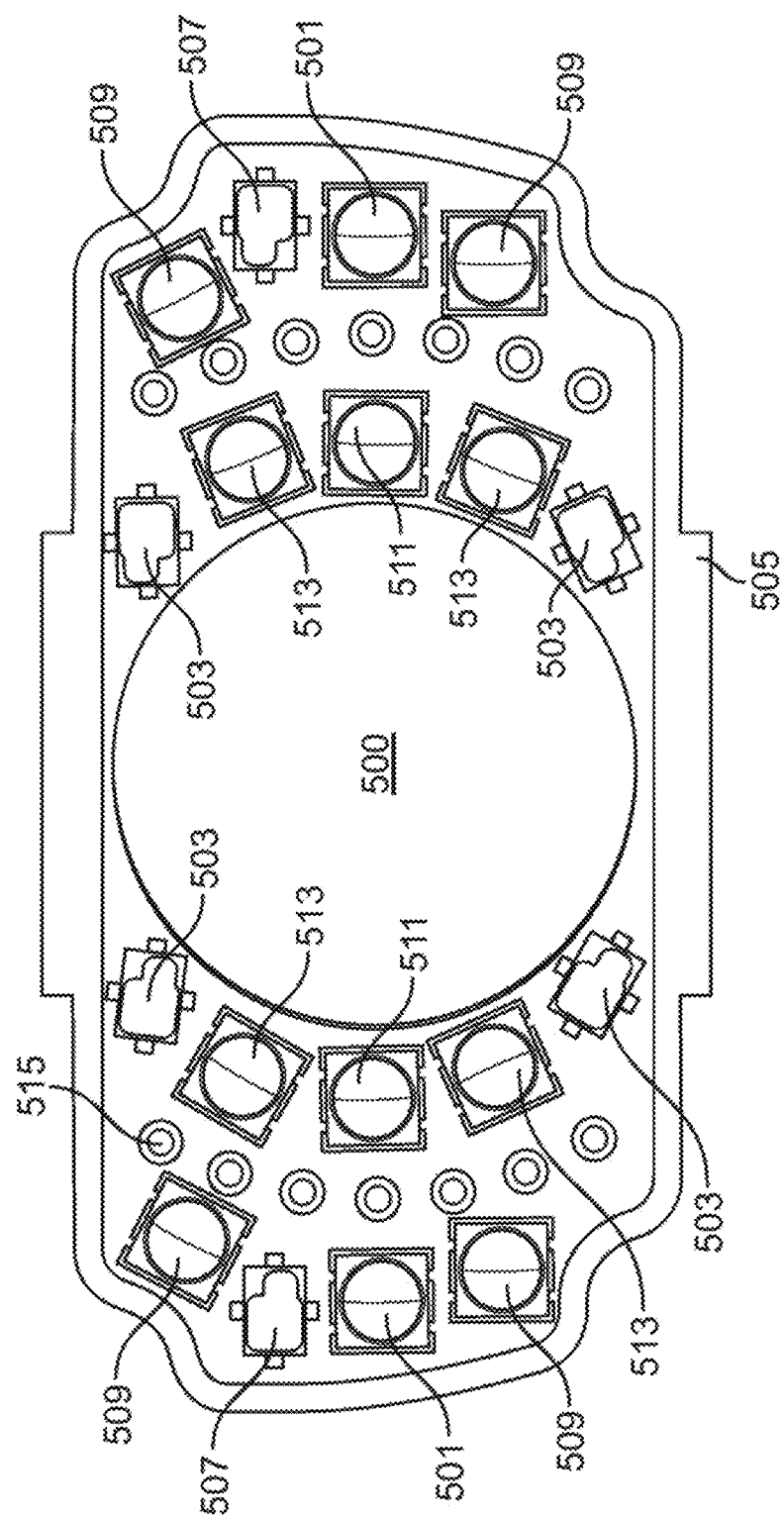
FIG. 5 illustrates an illuminator assembly according to some embodiments of the present disclosure.
Figure 6A:
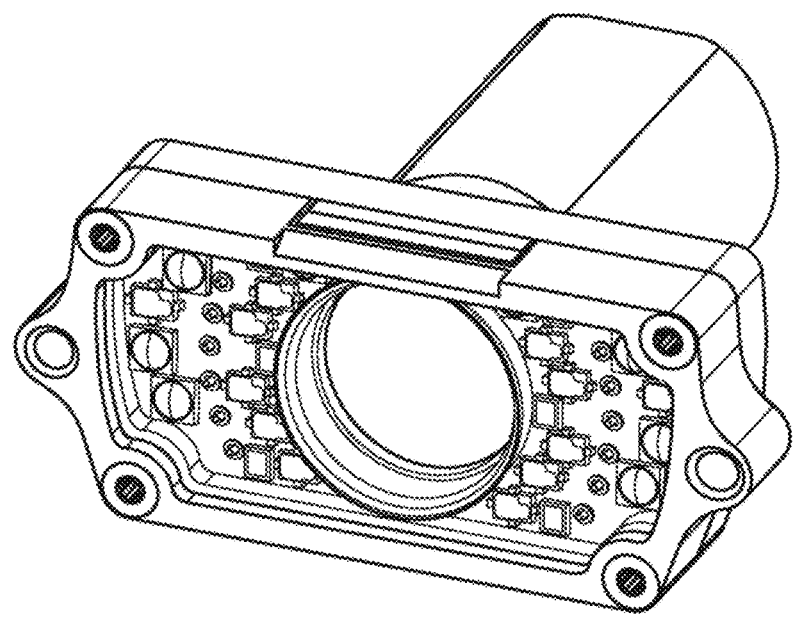
Figure 6B:
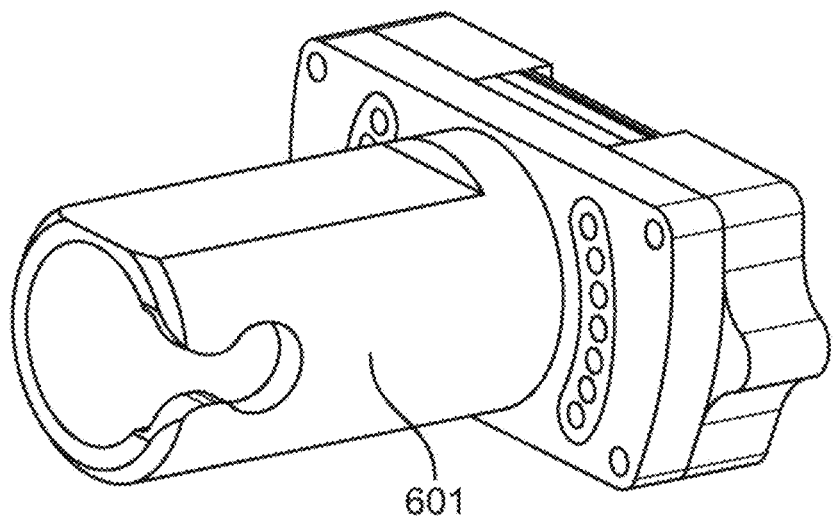
Figure 6C:
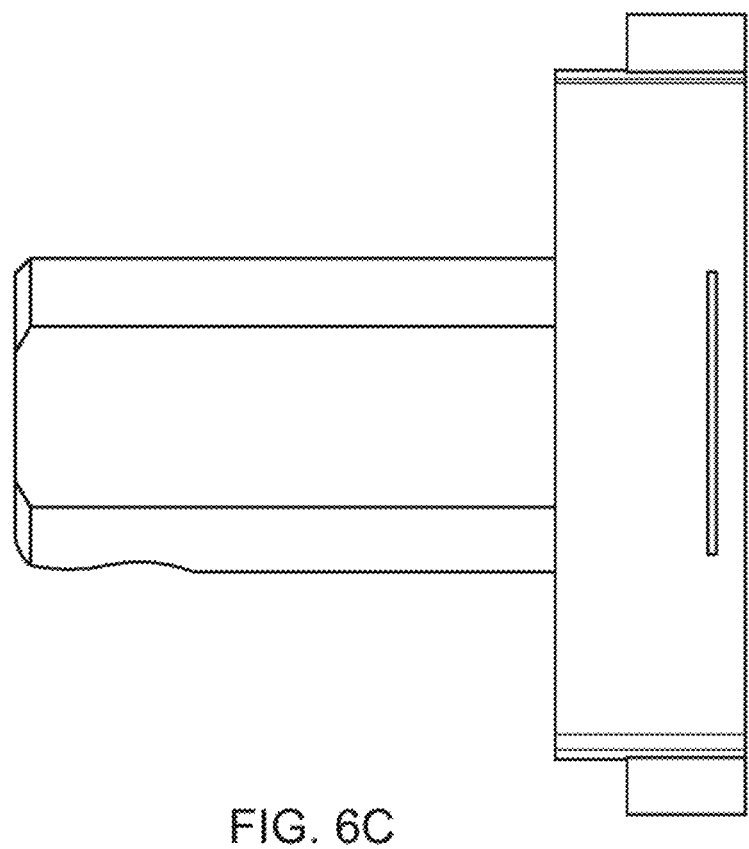
Figure 6D:
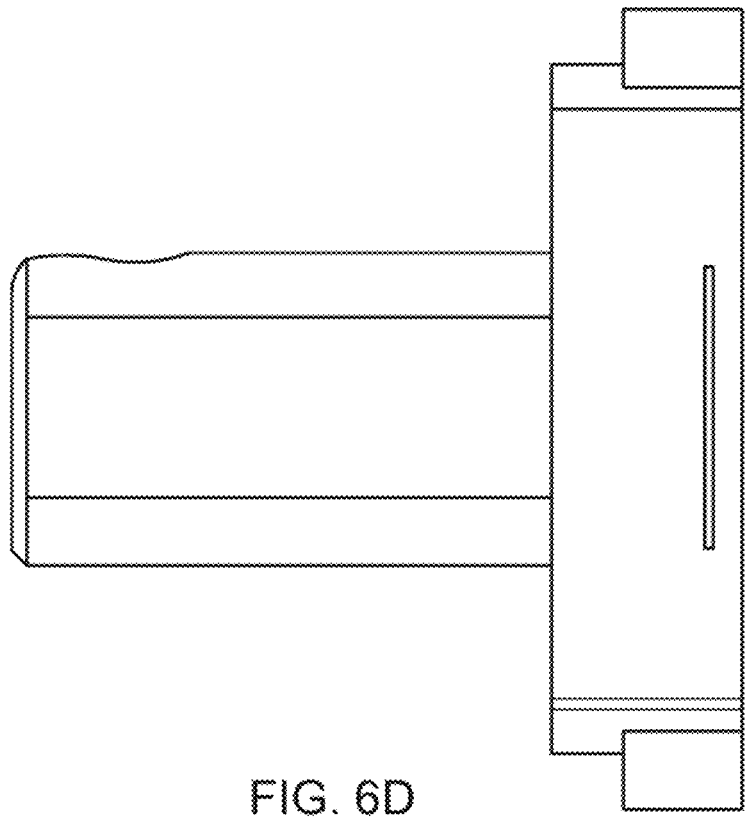
Figure 6E:
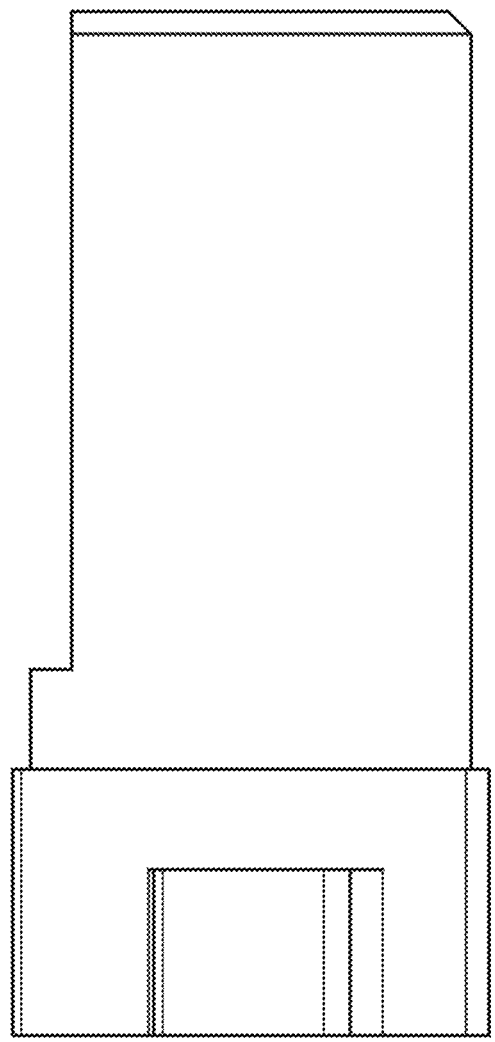
Figure 6F:
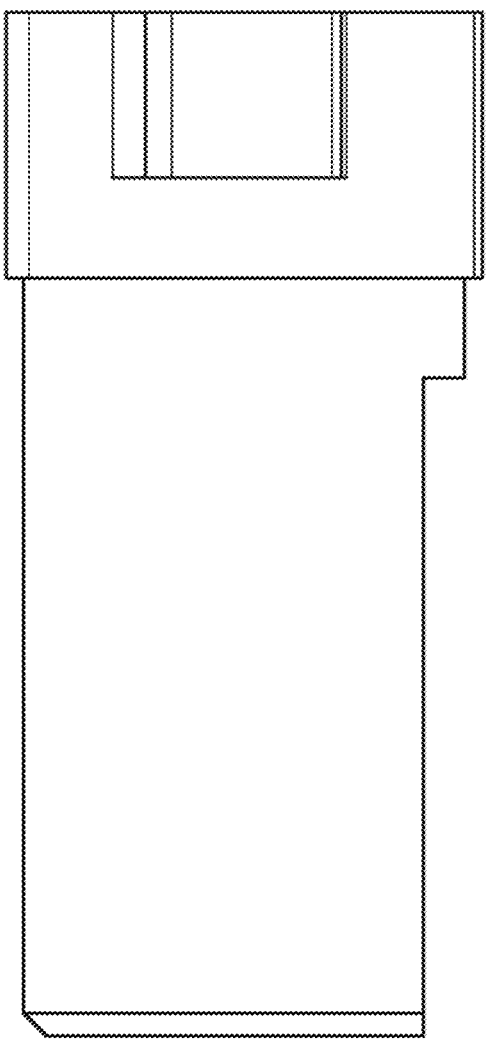
Figure 6G:
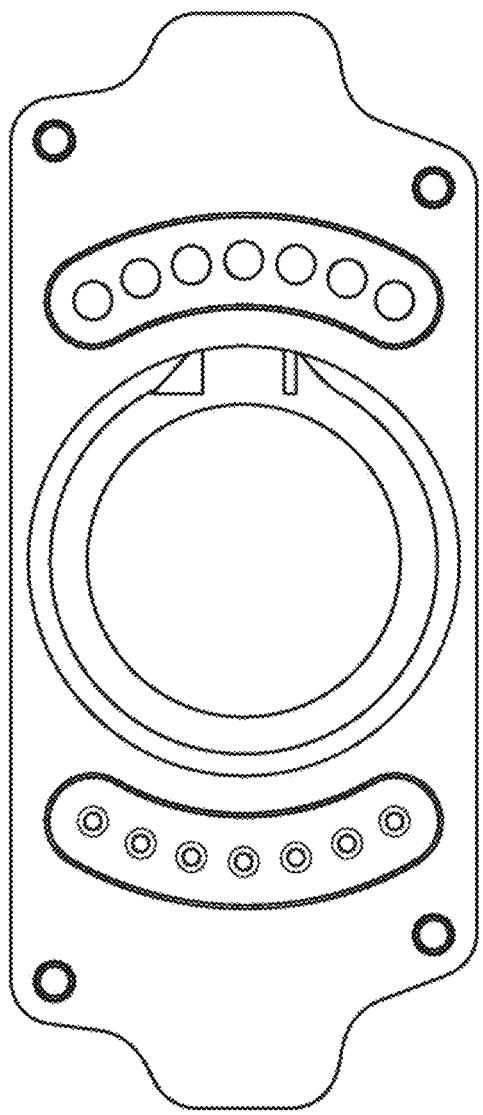
Figure 6H:
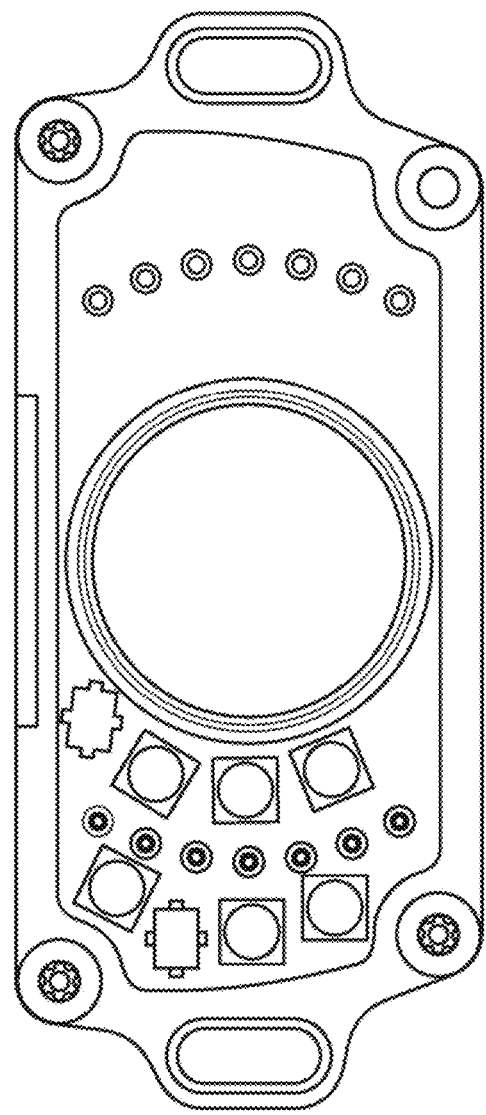
Figure 61:
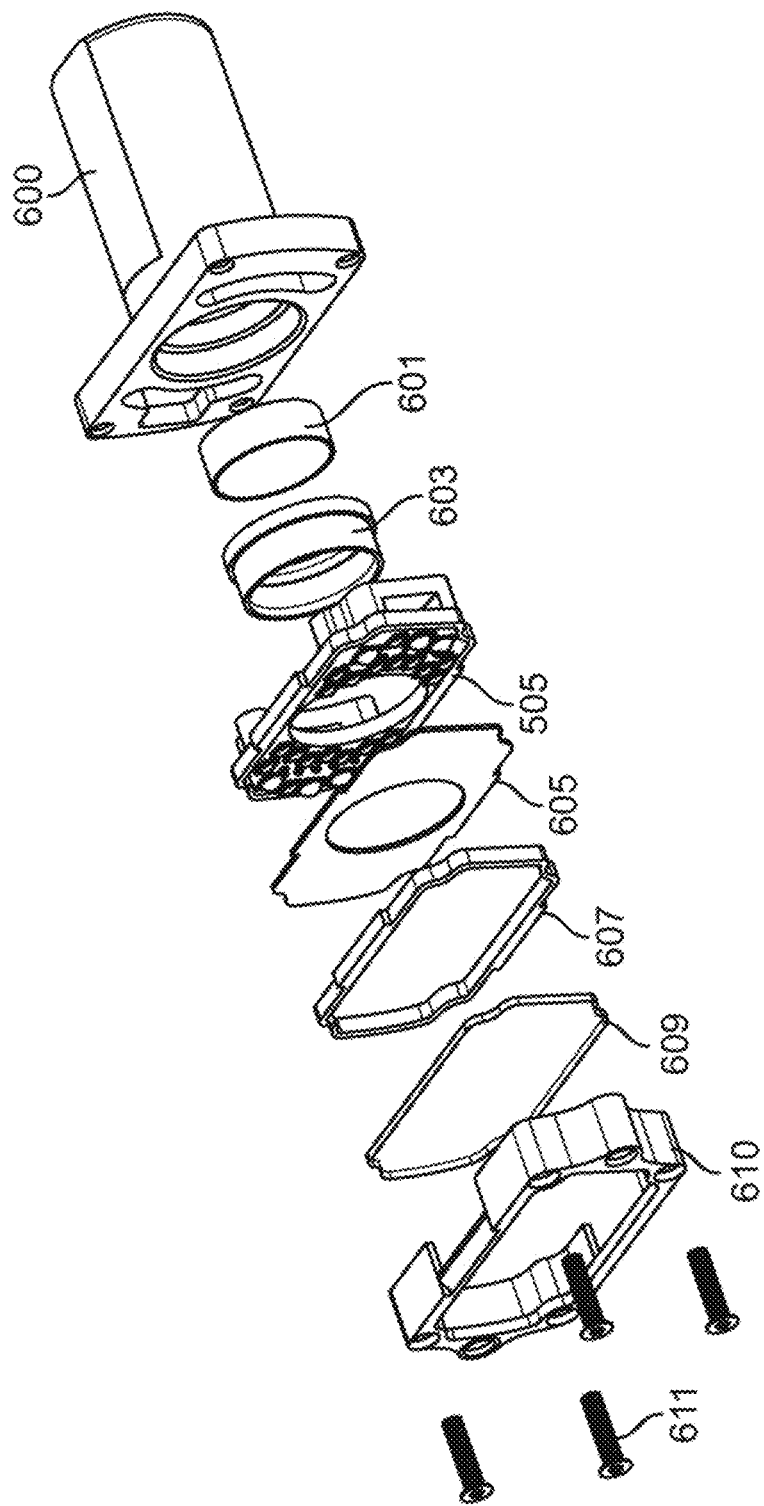

FIG. 5 is an illustration of an illumination substrate 505 that may be housed in a tip 401. In some embodiments, substrate 505 or the illuminator assembly may be housed directly in the handpiece, and not in a tip. By way of specific example, the illumination substrate 505 may be a printed circuit board (hereinafter PCB) in accordance with one or more embodiments of the present disclosure. The PCB comprises a plurality of LED light sources having different peak wavelengths. The LED light sources may be positioned symmetrically around the laser optical path 500. In some embodiments, LED light sources have peak wavelengths in the range of 300 nm to 1100 nm.

In the specific example of FIG. 5, there are two red LED light sources 501 with a peak wavelength of 660 nm. Four yellow LED light sources 503 with a peak wavelength of 590 nm. Two infrared LED light sources 507 with a peak wavelength of 860 nm. Four cyan LED light sources 509 with a peak wavelength of 490 nm. Two blue LED light sources 511 with a peak wavelength of 450 nm. Four green LED light sources 513 with a peak wavelength of 530 nm. In some embodiments, the PCB further comprises pins 515 for connection to the system and handpiece. A memory chip (not shown) may be placed on the opposite side of the PCB and is configured to identify to a handpiece a tip type that is connected. The number of LED light sources for each peak wavelength may be determined by the intensity of the peak wavelength required to obtain an image illuminated evenly.

Figure 11A:
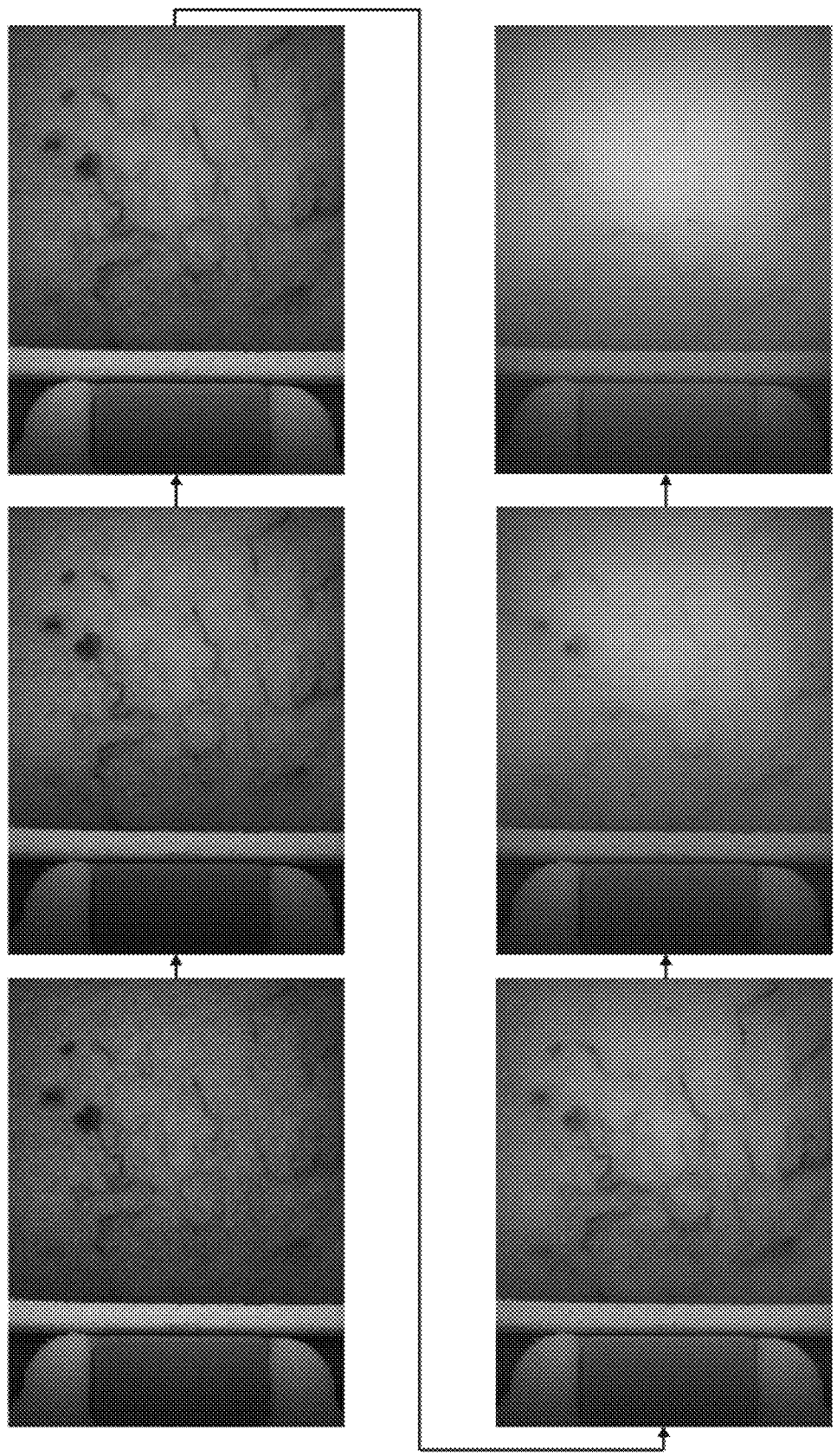
FIGS. 11A and 11B are two series of skin tissue images obtained according to some embodiments of the present disclosure.
Figure 11B:
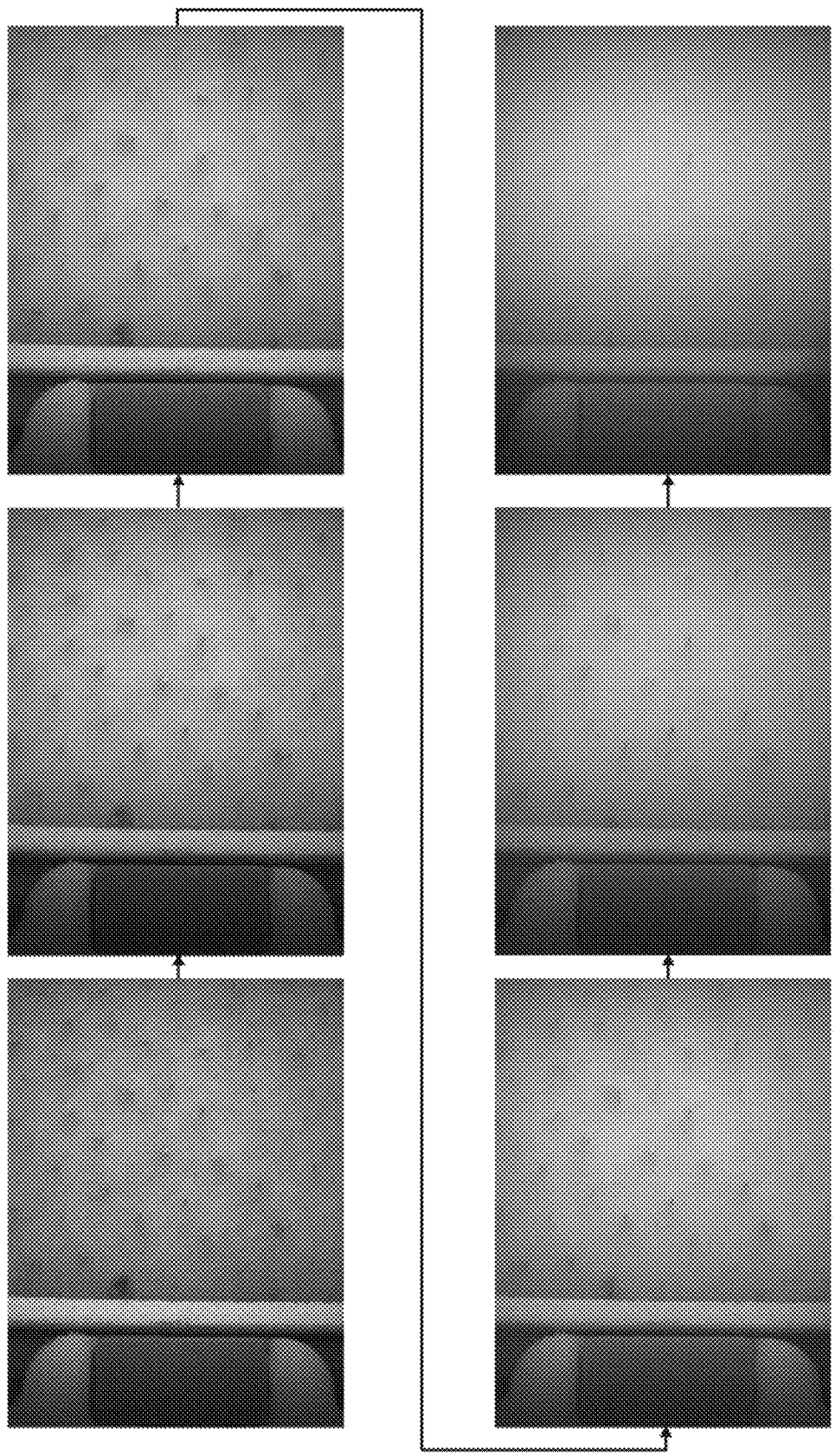

By way of example, FIG. 11A illustrates one series of skin images of a target tissue, each captured with a different illumination peak wavelength, obtained by the current disclosure's device and method. FIG. 11B is a second series of images, of a different target tissue, again captured with a different illumination peak wavelength and obtained by the current disclosure's device and method. The various levels of melanin, epidermal and dermal thickness and blood content of a target tissue is exposed with respect to the different light wavelengths. Basic skin optical and physical properties up to about 5 millimeters deep may be obtained and mapped spatially and across depth.

In some embodiments, the lens optics of the laser are housed in the tip. FIG. 6A to FIG. 6I illustrate a smart tip in accordance with one or more embodiments the current disclosure. Tip 401 may be removably attached to handpiece 400. In this example, tip 401 comprises; a tip base 600, a laser path lens 601, laser lens holder 603, illumination substrate or LED PCB 505, polarization illumination optics 605, a spacer 607, a window 609 that protects and seals the LED PCB 505, window housing 610 and a connection method 611 of any known type. The polarization illumination optics of the tip polarize the LED light sources and comprises a barrier free area in the center for the laser treatment to travel through.

Cooling unit 409, in some embodiments, may lower the temperature of the LED light sources to between 0 to 5 degrees Celsius. In some embodiments, tip 401 comprises a heating system (not shown) configured to maintain the temperature of the LED light sources in the range of 25 to 35 degrees Celsius, which is optimal to maintain the intensity of the LED light sources. In some embodiments, an algorithm for analysis will include a correction for any lower intensity of the LED light sources when there is no heating system.

Figure 7:
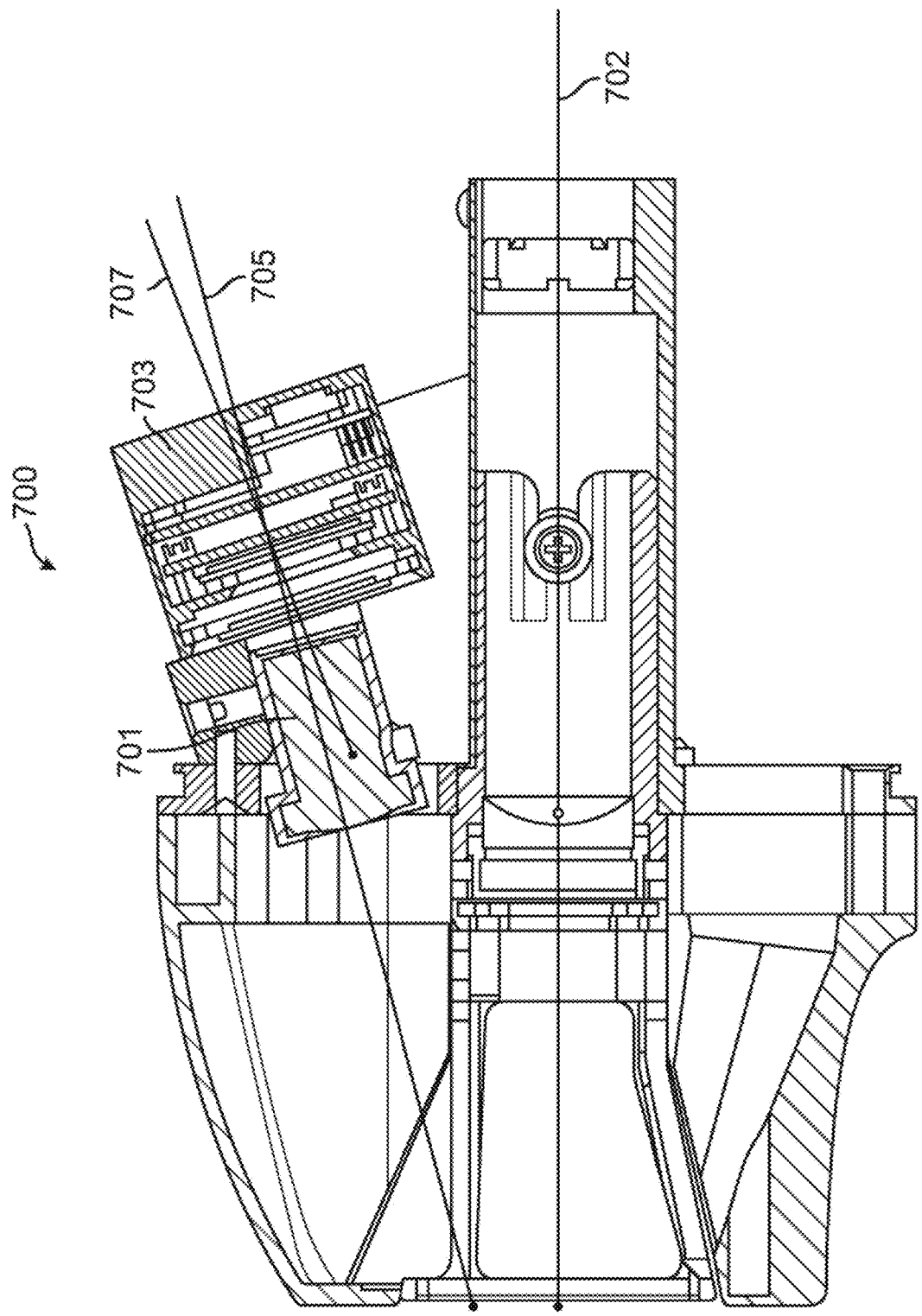
FIG. 7 illustrates an imaging unit in a handpiece according to some embodiments of the present disclosure.

FIG. 7 illustrate an imaging unit 700 that may be housed in handpiece 400 in the imaging housing 415. In this example of an imaging unit, the optical axis angle 705 of imaging lens 701 and the optical axis 707 of image sensor assembly 703 are offset and arranged such that the image obtained corrects a probable distortion based on the offset image sensor assembly 703. The angled position of image sensor assembly 703 relative to the main optical axis of the laser 702 may be configured to share the field of view of the image sensor and treatment area that may be covered by the laser. Since laser axis 702 is perpendicular to the target tissue, an angled image sensor 703 results in a distorted image. A countered angled imaging lens 701 may be configured to compensate and correct such distortion. In this specific example, the imaging lens is positioned such that the imaging lens axis 705 is a 14-degree angle to the laser axis 702 and the image sensor axis 707 is positioned in a 4.30-degree angle to the imaging lens axis 705.

Figure 8:
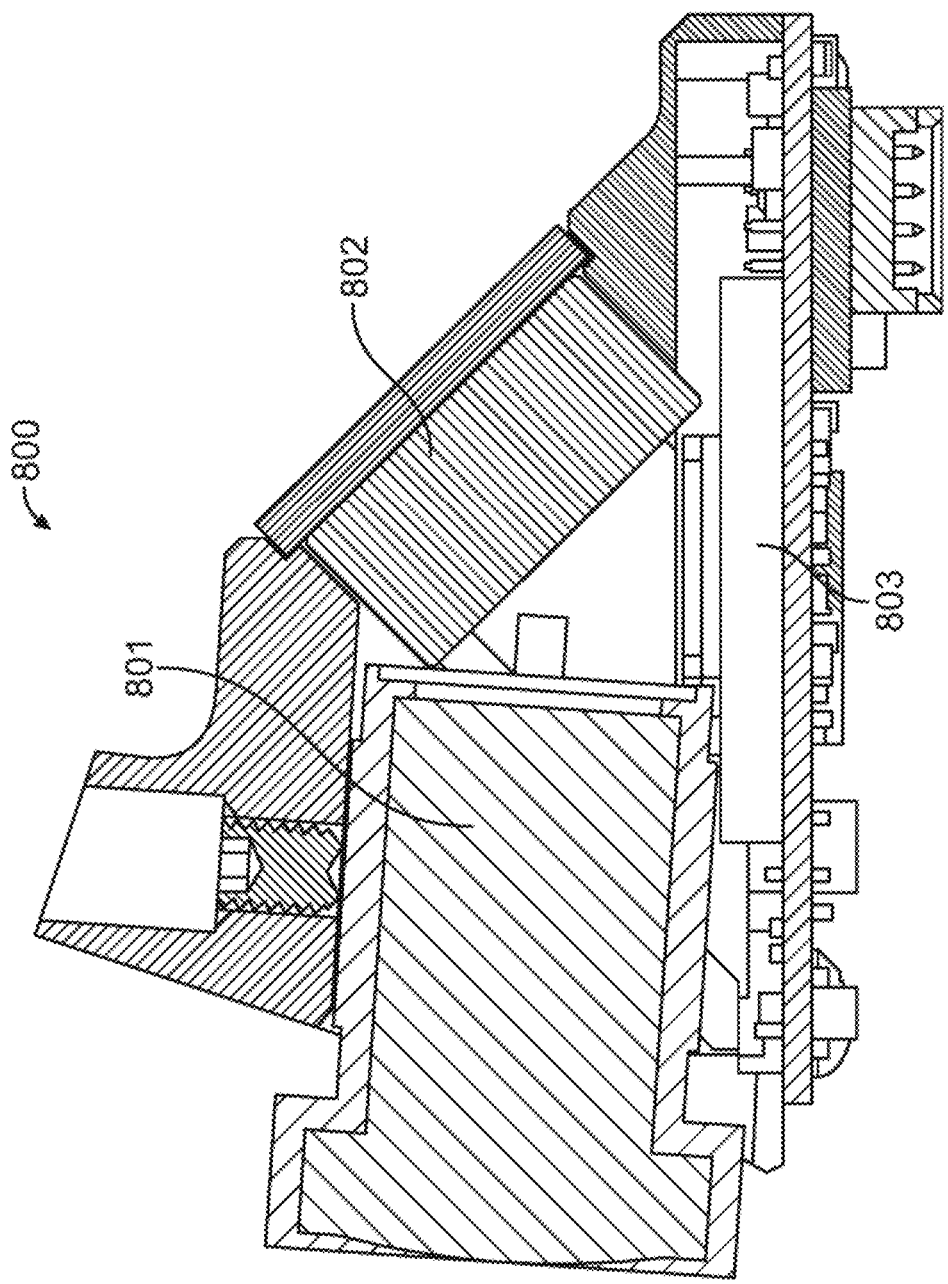
FIG. 8 illustrates an imaging unit on a handpiece according to some embodiments of the present disclosure.

FIG. 8 illustrates, in some embodiments, an imaging unit 800 that may be housed in imaging housing 415. In this configuration, an imaging lens 801 has an optical or lens axis (not shown) to a target tissue and that imaging lens axis path is folded by a folding image mirror 802, or similar optical element known in the art, to direct the image to the image sensor 803. In this example, the laser axis 702 is still perpendicular to the target tissue, and the image sensor placement alone will result in a distorted image of the target tissue. The optical arrangement of imaging lens 801, the folding mirror 802 and image sensor 803, is configured to compensate and correct for such distortion. In some embodiments, the correction of a distortion based on image sensor placement is done with a computer algorithm.

The controller of diagnostic and treatment system may be housed within a laser console and may comprise a suitable processor or computing unit. In some embodiments, the computing unit may comprise one or more processors and instruction stored on non-transitory computer-readable medium, which may be read and executed by the processor or processors.

In some embodiments, the controller is configured to acquire and analyze the diagnostic data. The controller may be further configured to manage the following components: the image sensor of the image system, the LED light sources of the illumination system, and the laser of the laser system.

Figure 9:
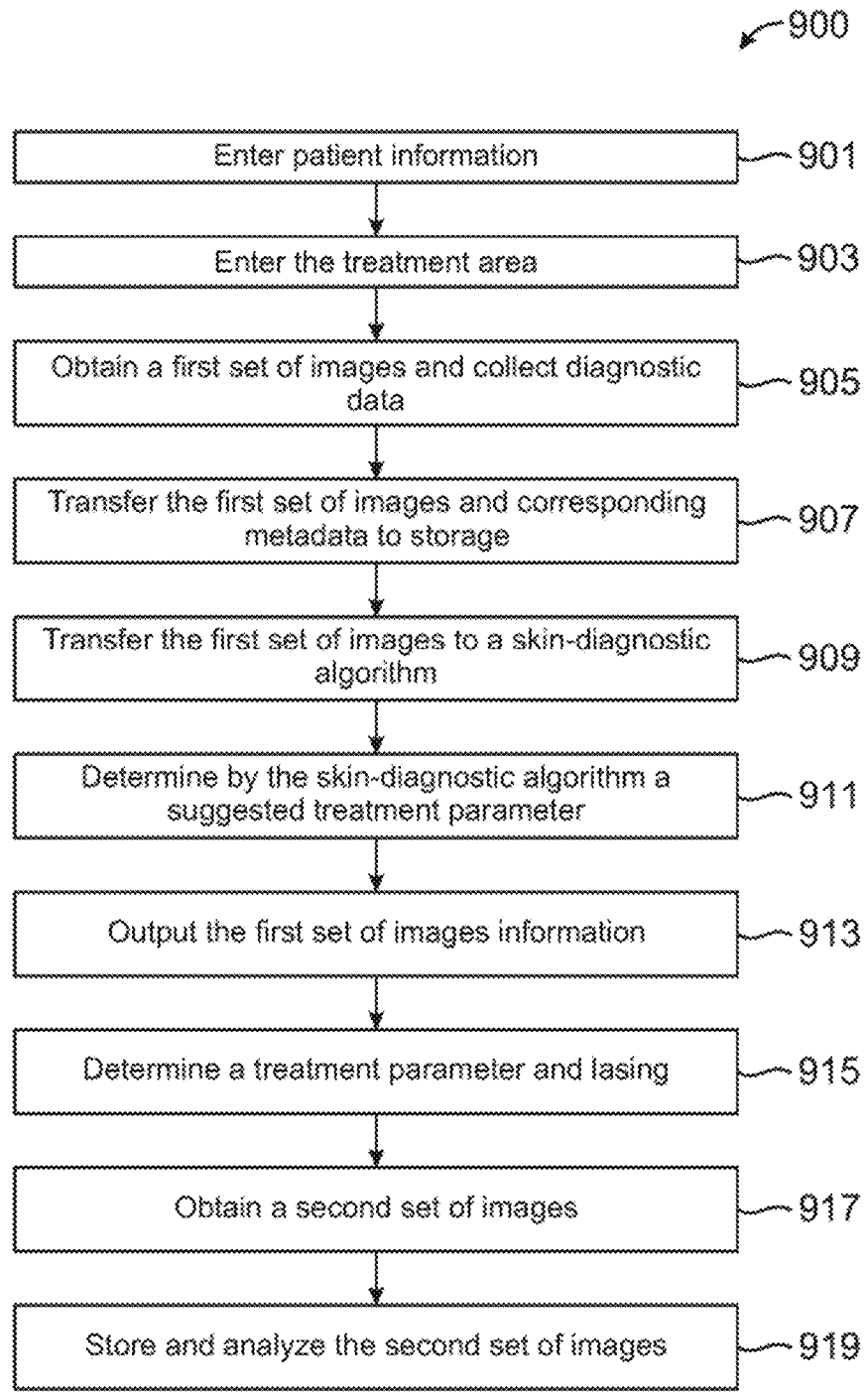
FIG. 9 illustrates a flow chart of a method according to some embodiments of the present disclosure.

FIG. 9 illustrates an example of a flowchart of method 900, in accordance with one or more embodiments of the present disclosure. Method 900 may include a user entering 901 a patient's information and entering 903 the treatment area into an input for a diagnostic and treatment system.

Method 900 may include collecting 905 diagnostic data by obtaining a first set of images of a target tissue. In some embodiments, a user will press a start button 411 to obtain the first set of images. In some embodiments, this data collection is done dynamically in real time before a laser treatment.

Method 900 may include transferring 907 the first set of images and their corresponding metadata to a database storage system or device. The metadata may include the first set of image's illumination peak wavelength, LED brightness, imaging sensor (such as a camera) exposure, and also camera gain.

Method 900 may include transferring 909 a first set of images to a skin diagnostic algorithm to analyze the diagnostic data.

Method 900 may include the skin-diagnostic algorithm determining 911 suggested treatment parameters, also known as treatment light regimens, for the target tissue. In some embodiments, the skin-diagnostic algorithm may use diagnostic data that may have been previously stored in the data base to assist in analyzing the first set of images. In some embodiments, the laser treatment parameters are set for the diagnostic and treatment system.

Method 900 may include a display unit to output 913 suggested treatment parameters and skin attributes about the first set of images after analysis. The display of skin attributes may include, among other things: skin melanin level, skin melanin map, skin erythema level or map, hair melanin level, hair diameter, hair density, hair width, hair count, hair mask and hair mask file. The output information may be in the form of a GUI on the display unit. This display of output information allows for a medical professional to evaluate and determine the parameter of treatment.

Method 900 may include a user determining a treatment parameter and lasing 915 the target tissue.

Method 900 may include obtaining 917 an automatic second set of images of the target tissue after lasing is completed.

Method 900 may include storing and analyzing 919 the second set of images. In some embodiments, this data collection is done dynamically in real time after a laser treatment.

In some embodiments, of the present exemplary method, the skin diagnostic system may have two working modes; an analysis mode for capturing, analyzing and suggesting preset without laser treatment and a treatment mode for capturing before and after image series of the treatment for data collection and analysis. In some embodiments, the skin analysis and diagnostic system 105 may have only an analysis mode for capturing, analyzing, providing relevant data on a display and suggesting presets for treatment.

In some embodiments, the skin and diagnostic system collects data from any input method and may include the skin-diagnostic algorithm to determine suggested treatment parameters, also known as treatment light regimens, (such as peak energy, energy fluence, pulse width, temporal profile, spot size, wavelength, train of pulses, and others), for the target tissue. In some embodiments, the skin-diagnostic algorithm may use diagnostic data that may have been previously stored in the data base to assist in analyzing the data from any input method.

In some embodiments, a display unit outputs suggested treatment parameters and/or skin attributes after analysis of any input method of collecting data. The display of skin attributes may include; color map, skin type, skin melanin level, skin melanin (pigment) map, skin erythema level, pigment density value, pigment depth map, vascular density value, pigment depth, vascular depth, vascular map, erythema map, vascular depth map, scattering map, pigment intensity, VL/PL ratio, hair melanin level, hair diameter, hair density, hair width, hair count, and hair mask file. The output information may be in the form of a GUI on the display unit. This display of output information allows for a medical professional to evaluate and determine the parameter of treatment.

The proposed technology may well provide significant benefits over present commercial devices because none appear to propose a handpiece with an angled imaging unit positioned correcting obtained image with optical elements.

Skin Imaging Apparatus

Figure 12:
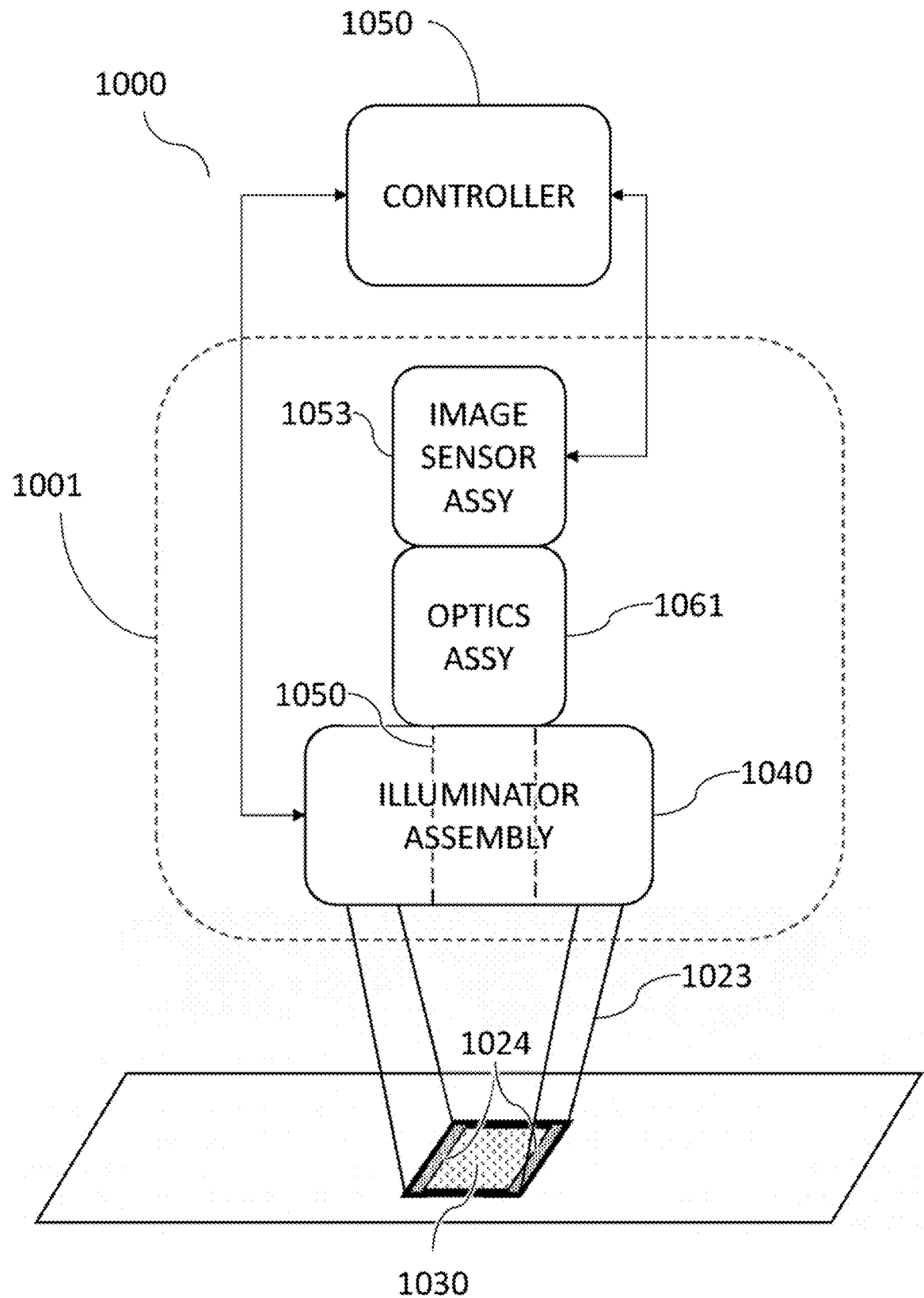
FIG. 12 is a diagram of an apparatus for sensing and analyzing skin condition, according to some embodiments of the invention.

FIG. 12 is a diagram of an apparatus 1000 for sensing and analyzing skin condition, according to some embodiments of the invention. The apparatus 1000 may be a diagnostic stand-alone unit (i.e., without a treatment light source). Nevertheless, the apparatus 1000 may be usable before, during, and after treatment with a laser-based or IPL-based treatment unit, to provide diagnostic information and/or treatment parameters to the treatment unit or to an operator of the apparatus 1000 or a dermatologist, for example.

The apparatus may comprise a frame 1023, configured to circumscribe a target tissue 1030 of a patient's skin, to stretch or flatten the target tissue 1030 for capturing of diagnostic images of the target tissue 1030. The frame 1023 may comprise one or more fiducial markers 1004. The fiducial markers 1004 may be included in the images and used for digital registration of multiple images captured of the same target tissue 1030.

The apparatus may comprise an electro-optics unit 1001, comprising an illuminator assembly 1030, an optics assembly 1061, and an image sensor assembly 1053.

The illuminator assembly 1040 may be configured to illuminate the target tissue 1030 during capturing of images. The illuminator assembly 1040 may comprise a plurality of sets of one or more illumination elements also called illumination light sources (such as LEDs), each set having a different optical output spectrum (e.g., peak wavelength). A combination of one or more of the optical spectra may be employed for illumination when capturing images of the target tissue 1030. Images at each optical spectrum may be captured individually, and the images subsequently combined. Alternatively, or additionally, illumination elements, of the illuminator assembly, of multiple optical spectra may be illuminated simultaneously to capture an image.

The illumination elements of the illuminator assembly 1040 may be arranged surrounding an opening 1050 of the illuminator assembly 1040 (e.g., arranged in a ring). The opening 1050 enables the optics assembly 1061 to collect illumination light reflected and/or backscattered from the target tissue 1030, and to reach the image sensor assembly 1053.

Alternatively or additionally, the optical axes of the illuminator assembly 1040 and of the optics assembly 1061 are angularly displaced, such that illumination from the illuminator assembly 1040 to the target tissue 1030 is unobstructed by the optics assembly 1061; and collection of backscattered/reflected illumination light from the target tissue by the optics assembly 1061 is unobstructed by the illuminator assembly 1040. Alternatively, or additionally, a beam splitter is used such that the optical axis of the optics assembly 1061 is coaxial with the illumination light from the illuminator assembly 1040 incident on the target tissue 1030.

The optics assembly 1061 focuses the reflected/backscattered illumination light onto an image sensor of the image sensor assembly 1053.

The apparatus may further comprise a controller 1050. The controller 1050 may be responsible for controlling the imaging parameters of the illuminator assembly 1040 and the image sensor assembly 1053. The imaging parameters may include the frame rate, the image acquisition time, the number of frames added for an image, the illumination spectrum, and any combination thereof. The controller 1050 may further be configured to receive an initiation signal from an operator of the apparatus (e.g., pushing of a trigger button) and may be in communication with a skin analysis system (further described herein).

FIG. 13A is an external view of a handpiece, in this embodiment a skin imaging handpiece 1300 according to some embodiments of the invention. In some embodiments, the handpiece 1300 comprises a trigger button 1301, a heatsink 1302, and a frame 1303 including fiducial markers 1304.

In some embodiments, the frame 1303 is removable from the handpiece 1300, enabling interchanging between frames of various sizes or shape, in accordance with treatment indications. FIG. 13B shows the frame 1303 removed from the handpiece 1300.

Figure 14:
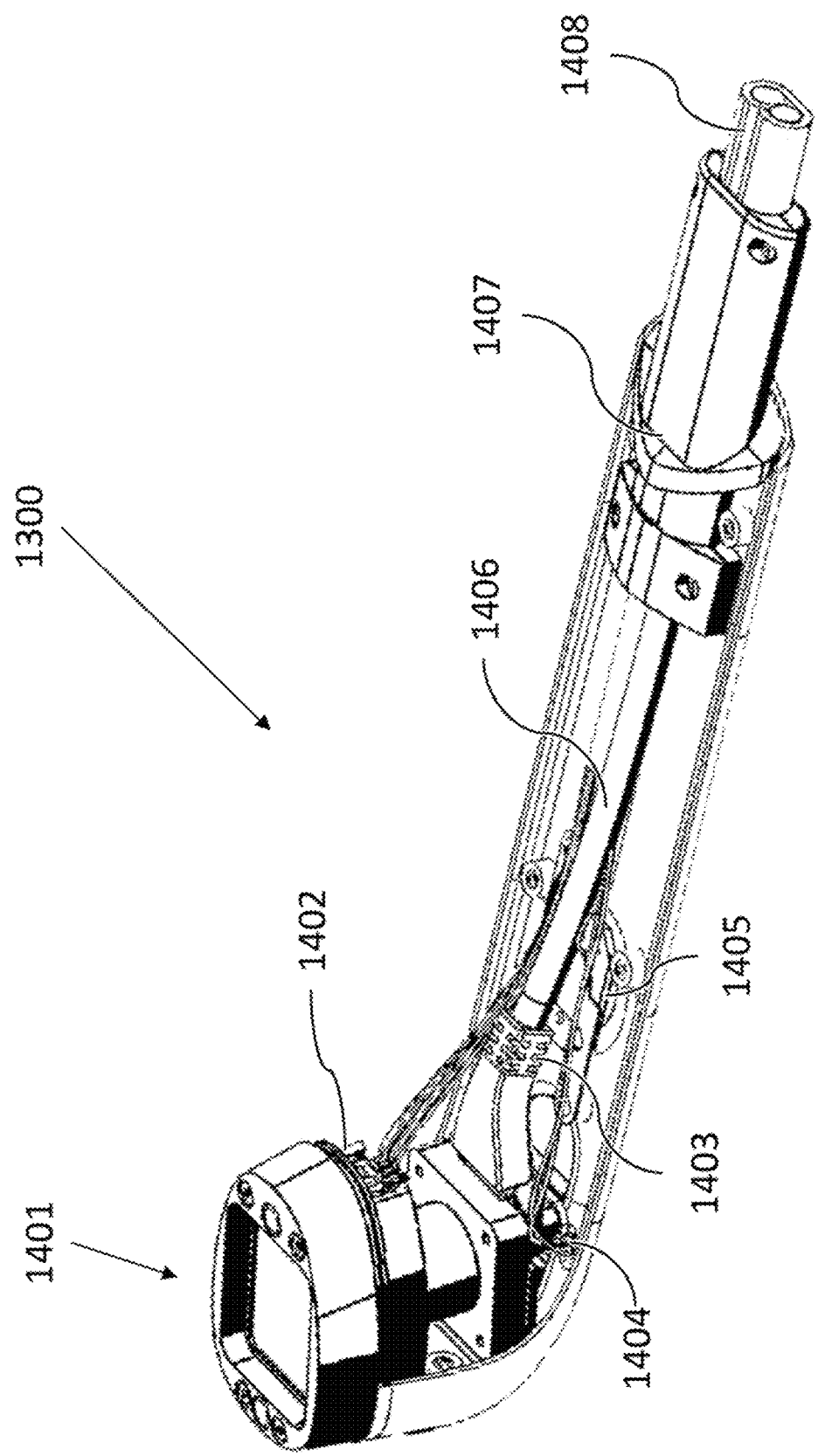
FIG. 14 is an internal view of the handpiece according to some embodiments of the invention.

FIG. 14 is an interior view of the handpiece 1000 according to some embodiments of the invention. The interior of the handpiece (also may be known as a skin imaging handpiece) 1000 may comprise an electro-optics unit 1401 including an LED board connector 1402, a USB cable 1403 which may have a custom connector for fitting the interior design specifications of the handpiece 1000, an I/O connector of an imaging sensor such as a camera 1404, a trigger button 1405, and an I/O cable 1406 that branches to the LED board 1402 and imaging sensor I/O connector 1404, and a main cable 1408 with a strain relief 1407. The I/O cable may send from a controller the commands of how to capture the images, the lighting etc.

Figure 15:
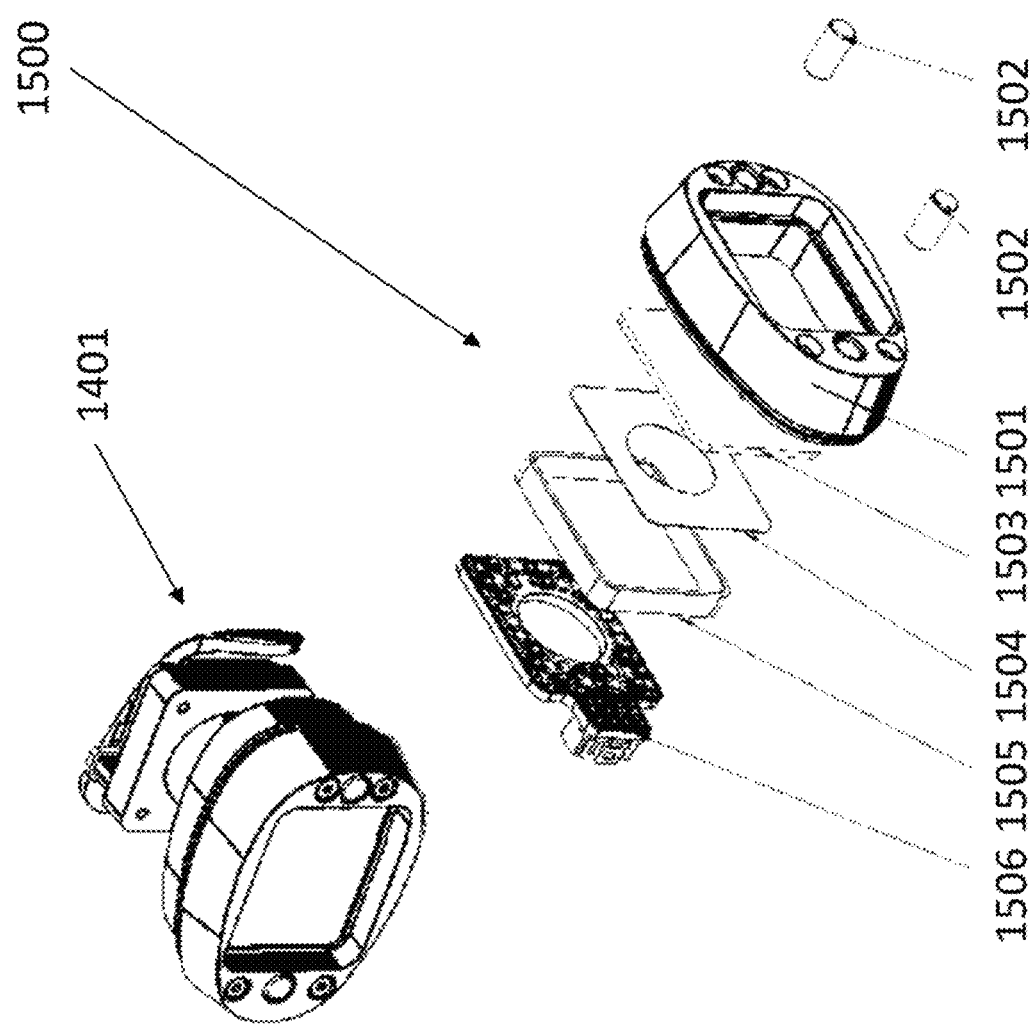
FIG. 15 is an exploded view depicting some elements of an electro-optics unit of the handpiece, according to some embodiments of the invention.

FIG. 15 depicts the electro-optics unit 1401 and an exploded view 1500 of some elements thereof, according to some embodiments of the invention. The electro-optics unit 1401 may comprise a front bracket 1501, securing magnets 1502 for the frame 1303 (see FIG. 13A-B), a protective window 1503, VIS-IR polarizers 1540, a spacer 1505, and an LED board 1506.

Figure 16:
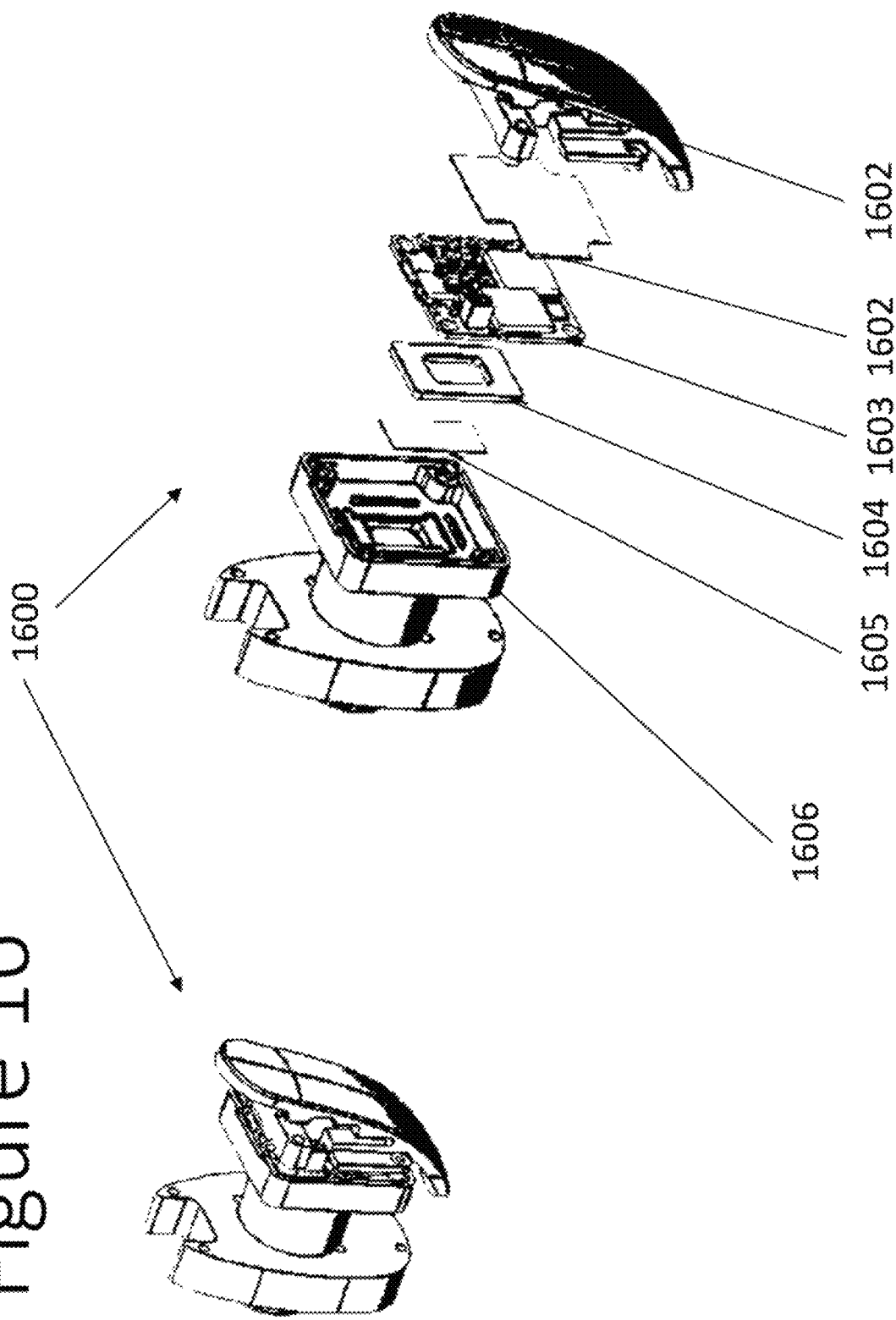
FIG. 16 is an exploded view of some elements of the electro-optics unit according to some embodiments of the invention.

FIG. 16 is an exploded view of some elements 1600 of the electro-optics unit 1401 according to some embodiments of the invention. The electro-optics unit 1401 further comprises the image sensor heatsink, which may be a camera heatsink 1601 (who exterior is shown as 1402 in FIG. 14A), a thermal contact pad 1602, imaging module 1603 (which includes an image sensor), an imaging polarizer 1605, and a rear bracket 1606.

Figure 17:
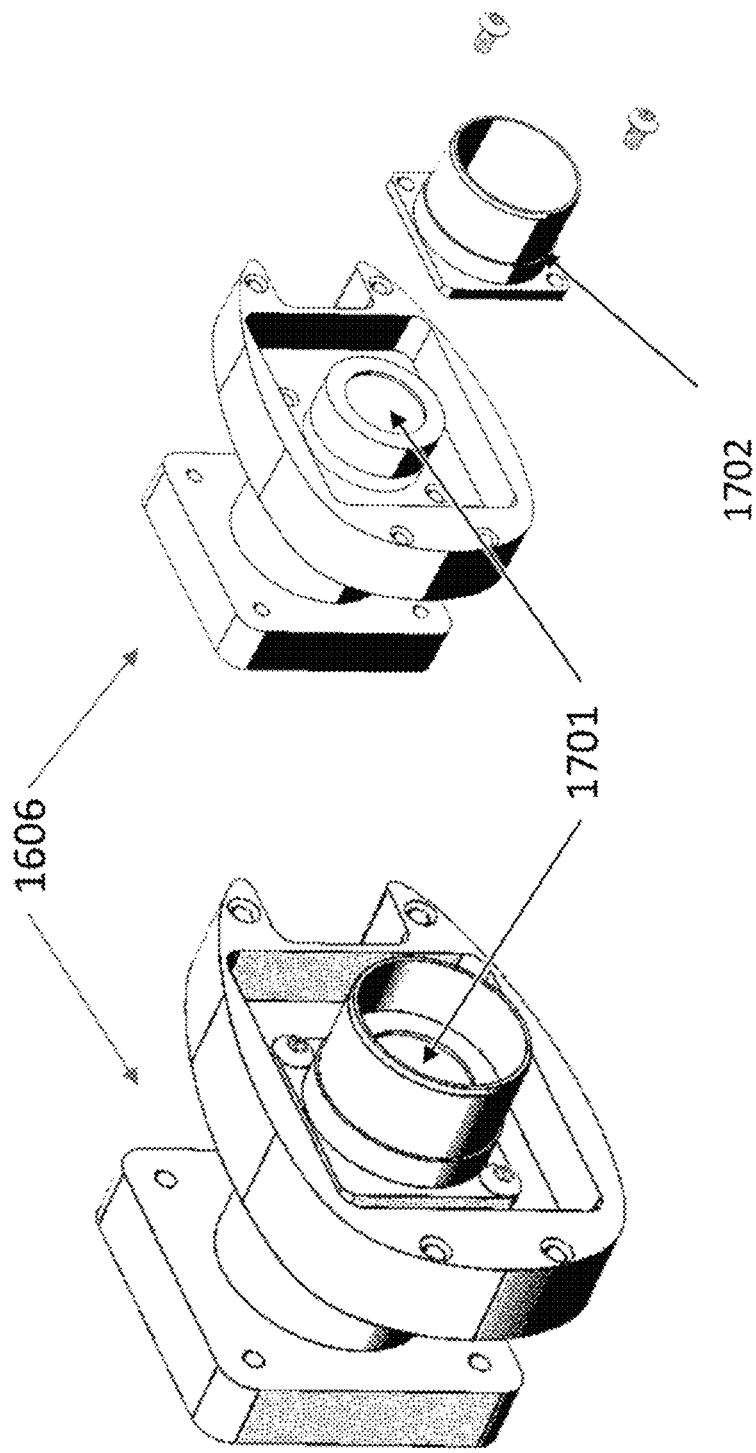
FIG. 17 shows details of the rear bracket, according to some embodiments of the invention.

FIG. 17 shows details of the rear bracket 1606, according to some embodiments of the invention. An imaging lens 1701 is mounted in the rear bracket 1606. A lens tube 1702 is mounted in front of the imaging lens 1701.

The handpiece 1300 may further comprise a controller, for control of the LEDs on the LED board 1506 and the imaging module 1603. The controller may be disposed inside the handpiece 1300. In some embodiments the controller is connected to an external main unit, or any device that is capable of communication interface between the controller and the handpiece such as a network interface, router, or switch.

Figure 18:
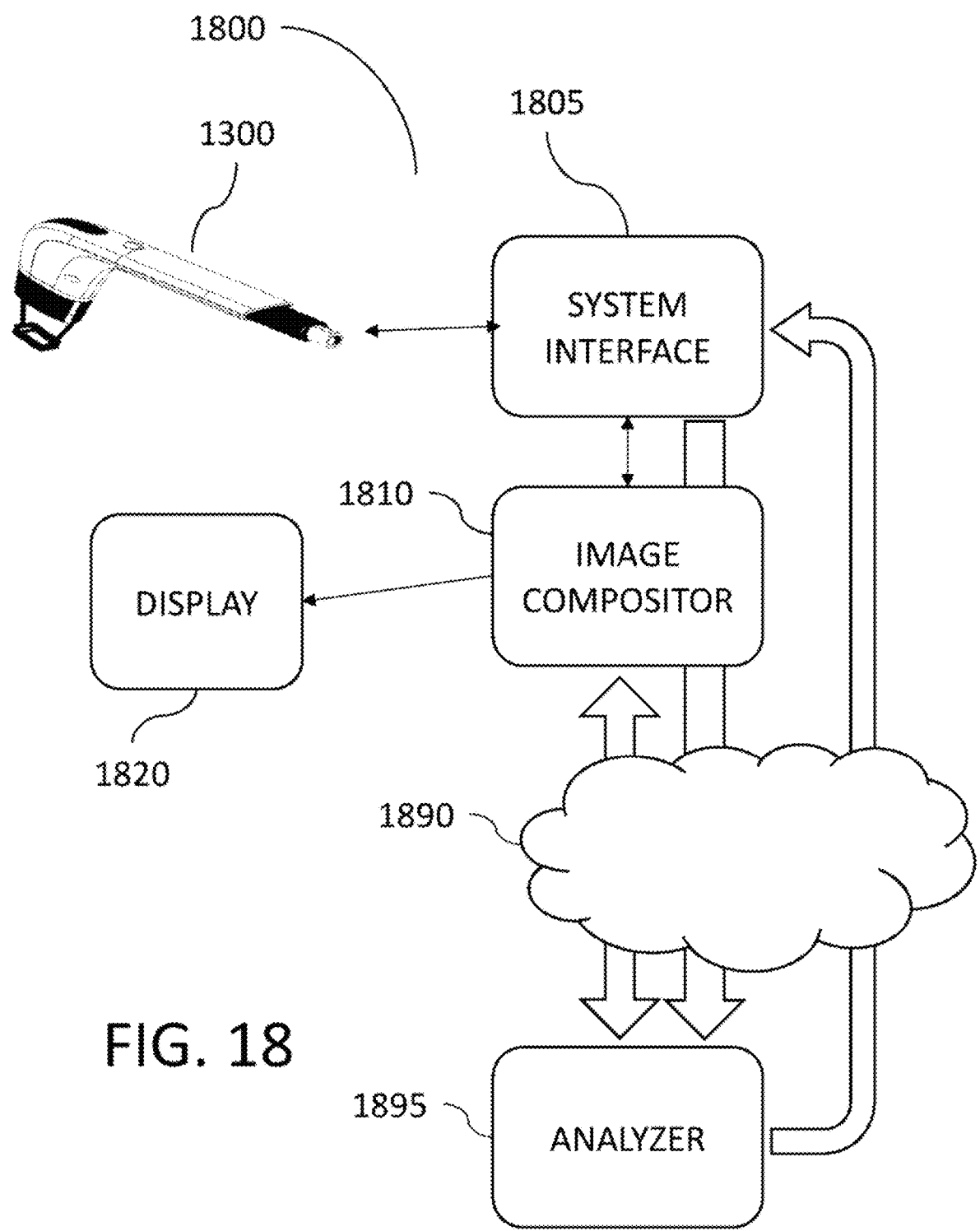
FIG. 18 is a functional block diagram of a system for skin imaging and analysis, according to some embodiments.

Reference is now made to FIG. 18, a functional block diagram of a skin analysis system 1800, according to some embodiments. The skin analysis system 1800 may comprise the handpiece 1300 and a system interface 1805, responsible for interfacing the handpiece 1300 with other components of the system 1800.

In some embodiments, the skin analysis system 1800 further comprises an image compositor 1810. The image compositor 1810 receives, from the system interface 1805, data of images acquired by the handpiece 1300. The images are of a target tissue 1030 (see FIG. 12), captured under one or more different illumination spectra; for example, different images of the area of skin captured under illumination from LEDs with different peak wavelengths. The image compositor 1810 may mix one or more received images, in prescribed ratios or by a prescribed algorithm, to produce a composite image. One or more composite images may be combined into a new composite image. The image compositor 1810 may furthermore identify, in an original or composite image, some features of the skin (e.g., hair, glands, blood vessels, etc.), which may be emphasized or subtracted in a subsequent composite image. Composite images and/or skin parameters may be transmitted by the image compositor to a display 1820, via an I/O to be viewed by an operator of the handpiece 1300.

In some embodiments, the image compositor 1810 produces one or more of the following image types: an RGB image, a skin melanin map, a skin erythema map, a blood vessel map, a photon scattering map, an intermediate melanin map; a deep melanin map, a blood vessel depth map; tattoo ink analysis map; wrinkles map; lesion map; acne map; cellulite map, or any combination thereof.

In some embodiments, the skin analysis system 1800 further comprises an analyzer 1895. In some embodiments, the analyzer 1895 is remotely connected to the rest of the system 200 by a network 1890, as shown in FIG. 18. The analyzer 1895 may receive acquired images from the system interface 1805 and/or composited images from the image compositor 1810. The analyzer computes, based on the received images, a diagnosis of the skin condition and/or a parameters of a suggested treatment course (e.g., with optionally attached laser- or IPL-based treatment handpiece). Further details of the skin analyzer system are provided in U.S. patent application Ser. No. 17/203,994, incorporated herein by reference. The diagnosis and/or the parameters may be sent to the display 1820 for viewing by the operator.

In some embodiments, the handpiece 1805 may transmit images to the analyzer 1895, or the image compositor 1810 may be further enabled, to compute numerical parameters of skin, based on the captured and/or composite images. For example, the system may compute one or more of the following parameters:

1. A skin melanin level;
2. A skin erythema level;
3. A hair melanin level;
4. A hair diameter;
5. A hair density;
6. A hair width;
7. hair count;
8. blood vessel depth;
9. blood vessel diameter;
10. melanin contrast;
11. melanin depth; and
12. pigment depth.

It is understood that the functions of the handpiece controller 1050 (see. FIG. 12), the system interface 1805, the image compositor 1890, and/or the analyzer 1895 may be implemented by any combination of software and in one or more pieces hardware. Furthermore, the software and/or hardware may be disposed in proximately to the handpiece 1300, remotely, or any combination thereof. Furthermore, the software and/or hardware may be accessible to the apparatus 100 by any short-, medium-, or long-distance networking means known in the art, wired or wirelessly.

Figure 19:
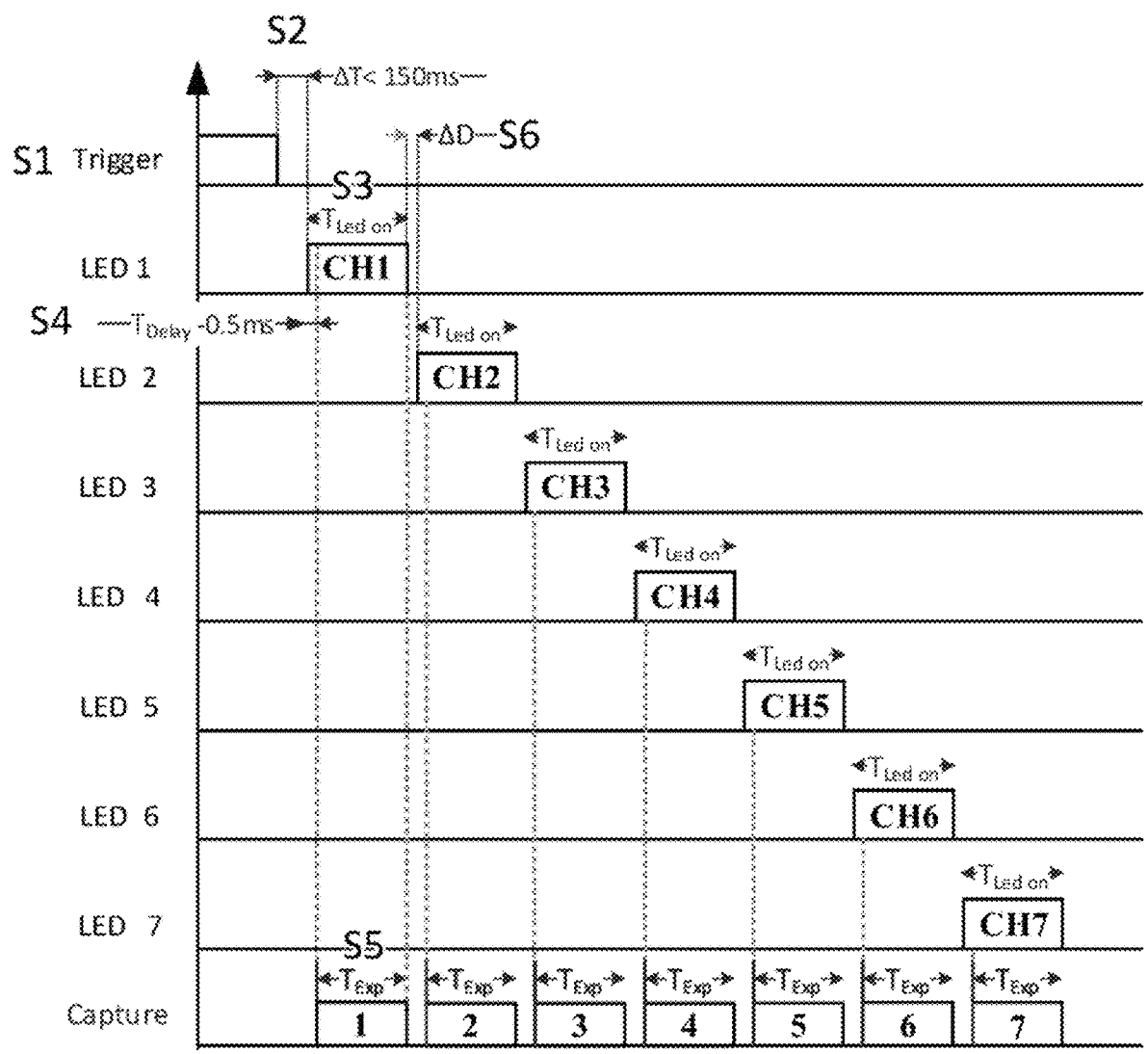
FIG. 19 is a timing diagram for a sequence of the apparatus to collect images of the target tissue, according to some embodiments.

Reference now also made to FIG. 19, by way of a specific example, a timing diagram for a sequence of the apparatus 1300 to collect images of the target tissue 1030, according to some embodiments.

At S1, a sequence begins when an operator presses and releases the trigger button 1405 of the handpiece 1300.

At S2, there is a delay time of ΔT before illumination is activated. In some embodiments, ΔT is less than approximately 150 ms.

At S3, one or more LEDs in a set of LEDs of the LED board 1506 having a particular peak wavelength are turned for a duration of $T_{LED\text{-}on}$. In some embodiments, $T_{LED\text{-}on}$ is defined by configurable settings of the handpiece 1300.

At S4, after the set of LEDs is first turned on, there is a delay time of $T_{delay}$ before exposure of the image sensor in the imaging module 1603 to backscattered/reflected illumination light from the target tissue 1030.

At S5, the image sensor is exposed for a period of $T_{exp}$. In some embodiments, $T_{exp}$ is defined by configurable settings of the handpiece 1300.

At S6, there is a delay time of ΔD before activating the next set of LEDs. The sequence is then repeated from S3 for each set of LEDs.

Figure 20:
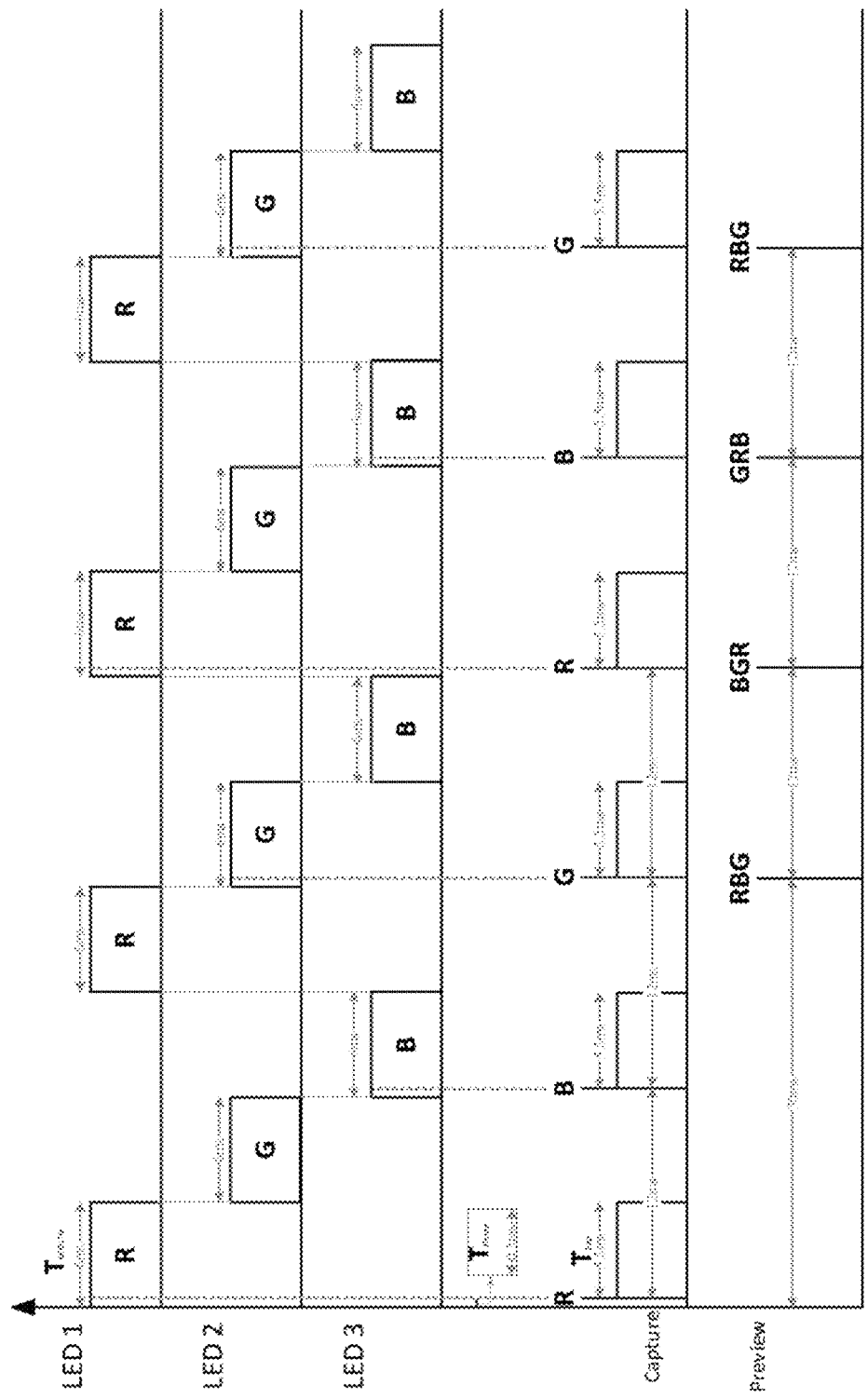
FIG. 20 shows how a display of the system is updated with the sequence, according to some embodiments.

FIG. 20 shows how the display of the system is updated with the sequence. In some embodiments, a rolling average of n frames is displayed, where n is the number of sets of LEDs, each with a different optical spectrum. For example, for an RGB type image, a first frame can be an average of the last three frames, one with red illumination, one with green, and one with blue illumination.

A computer, processor or computer system, as used herein, include any combination of hardware and software. A machine-readable medium, as used herein, may include any medium and/or mechanism for storing or transmitting information in a form readable by a machine (e.g., a computing device).

As used herein, the term "dynamically" and term "automatically," and their logical and/or linguistic relatives and/or derivatives, mean that certain events and/or actions can be triggered and/or occur without any human intervention. For the purposes of this disclosure, "light source" and "illumination elements" are used interchangeably.

In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described herein, various embodiments may be readily combined, without departing from the scope or spirit of the present disclosure.

The invention claimed is:

1. A skin imaging apparatus comprising,
a main body having a distal end;
a frame spaced a distance from and attached to the distal end of the main body of the apparatus, configured to circumscribe and contact a target tissue on the skin of a patient;
an electro-optics unit, comprising
an illuminator assembly, the illuminator assembly being located in the distal end of the main body and comprising illuminating elements having different peak wavelengths, and configured to provide illumination light on the target tissue in a sequence for capturing a plurality of images;
an imaging optics assembly; and
an image sensor assembly, comprising an image sensor, wherein the imaging optics assembly is configured to collect images of illumination light that is backscattered from the target tissue and focus the collected backscattered illumination light on the image sensor;
a controller, configured to turn the illuminating elements on and off and to capture each said images; and
a display configured to display images in any combination of captured images, wherein the display is updated by a rolling average of n frame images of each image captured at one peak wavelength value, wherein n is the number of different peak wavelengths to be displayed.

2. The skin imaging apparatus of claim 1, further comprising fiducial markers on the frame, wherein the fiducial markers are included in each image.

3. The skin imaging apparatus of claim 2, wherein the controller is further configured to employ the fiducial markers for registration of multiple images.

4. The skin imaging apparatus of claim 3 further comprises a heatsink, a thermal contact pad, an imaging polarizer, and an input output cable.

5. The skin imaging apparatus of claim 3, wherein the controller is communicatively connected to a memory with executable instructions, and the apparatus further comprises a trigger button configured for a user to press to execute the executable instructions to turn the illuminating elements on and off and to capture each said image from the image sensor.

6. The skin imaging apparatus of claim 3, wherein the frame is a removable frame configured to be removed from the skin imaging apparatus.

7. The skin imaging apparatus of claim 6, wherein the frame and the skin imaging apparatus further comprise magnets configured to attach and remove the removable frame from the skin imaging apparatus.

8. The skin imaging apparatus of claim 1, wherein the illumination elements are LEDs.

9. The skin imaging apparatus of claim 1, wherein one or more of the illumination elements are configured simultaneously to illuminate the target tissue for capturing an image.

10. The skin imaging apparatus of claim 9, wherein the image compositor is configured to produce one or more of the following types of composite images: an RGB image, a skin melanin map, a skin erythema map, a blood vessel map, a photon scattering map, an intermediate melanin map; a deep melanin map, a blood vessel depth map; tattoo ink analysis map; wrinkles map; lesion map; acne map; cellulite map, a pigment depth map; a vascular map; a vascular depth map; or any combination thereof.

11. The skin imaging apparatus of claim 1, further comprising an image compositor, communicatively connectible to the controller, configured to receive the captured images, captured under different spectral illumination, from the controller and to mix combinations of the received spectral images to produce a composite image.

12. The skin imaging apparatus of claim 1, further comprising an analyzer communicatively connectible to the image compositor, the analyzer configured to, receive any combination of captured images and composite images; and compute, based on the received images, a skin condition parameter, diagnosis of skin condition, parameters of a suggested treatment course, or any combination thereof;

send the diagnosis or parameters to the display.

13. The skin imaging apparatus of claim 1, wherein the image compositor and/or analyzer are further configured to compute numerical parameters of the target tissue, on the basis of any combination of the captured images, composite images, or analysis thereof.

14. A method comprising;

providing a main body having a distal end; a frame spaced a distance from and attached to the distal end of the main body of the apparatus, configured to circumscribe and contact a target tissue on the skin of a patient, a controller, an imaging optics assembly; an image sensor, illuminating elements the illuminating elements being located in the distal end of the main body and having different peak wavelengths, and a display;

activating, in a sequence and by the controller, the illuminating elements having different peak wavelengths, such that illumination light from the illuminating elements is directed to the target tissue;

receiving, by the controller, images of collected light reflected from the target tissue the image in response to the illumination light processing, by the controller, the images of the illumination light received; and displaying, by the controller, on the display, the images in any combination, wherein the display is updated by a rolling average of n frames images of each image captured at one peak wavelength value, wherein n is the number of different peak wavelengths to be displayed.

15. The skin imaging and diagnostic method of claim 14, further comprising a memory associated with the controller;

computing, based on the images and by the controller, at least one of, a skin condition parameter, a diagnosis of a skin condition, and parameters of a suggested treatment course; and displaying, on the display, at least one of, the diagnosis of a skin condition, and the parameters of a suggested treatment course.

16. The method of claim 14, providing a trigger button configured for a user to press to execute the executable instructions of the controller and when pressed cause the controller to:

activate, at a delay of $\Delta T$ (150 ms) from the trigger button press, the illumination light at a first illumination spectra for a duration of $T_{LED-on}$;

collect, at a delay time of $T_{delay}$ from the time of the illumination at the illumination spectra and by an image optic assembly, a first set of images of backscattered illumination light from the target tissue, wherein the image optic assembly is exposed for a period of $T_{exp}$;

activate again, at a delay time of 4D from the collection of a first set of images, the illumination light at a second illumination spectra;

collect again, at a delay time of $T_{delay}$ from the time of the illumination at the second illumination spectra and by the image optic assembly, a second set of images of backscattered illumination light from the target tissue;

composite and display the first and second set of images to produce a plurality of composited images representing a plurality of skin attributes of the target skin.

17. The method of claim 14, wherein activating the illumination light is repeated at a plurality of illumination spectra, and collecting sets of images is repeated for each of the plurality of illumination spectra.

* * * * *